United States Patent
Weil et al.

(10) Patent No.: US 12,358,825 B2
(45) Date of Patent: Jul. 15, 2025

(54) MOLTEN GLASS FEEDING AND MOLDING

(71) Applicant: Owens-Brockway Glass Container Inc., Perrysburg, OH (US)

(72) Inventors: Scott Weil, Perrysburg, OH (US);
Walter Anderson, Maumee, OH (US);
Karl Johnston, Perrysburg, OH (US);
Robin L Flynn, Waterville, OH (US);
Gregory W. Nafziger, Archbold, OH (US); Alexandra Fuller, Neuburg am Inn (DE); Bernard Altendorfer, Waldkirchen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 83 days.

(21) Appl. No.: 17/489,874

(22) Filed: Sep. 30, 2021

(65) Prior Publication Data
US 2022/0098080 A1 Mar. 31, 2022

Related U.S. Application Data

(60) Provisional application No. 63/085,640, filed on Sep. 30, 2020.

(51) Int. Cl.
C03B 7/14 (2006.01)
C03B 7/00 (2006.01)
C03B 7/18 (2006.01)

(52) U.S. Cl.
CPC ............... *C03B 7/14* (2013.01); *C03B 7/005* (2013.01); *C03B 7/18* (2013.01)

(58) Field of Classification Search
CPC .. C03B 7/086; C03B 7/14; C03B 7/18; C03B 9/34; C03B 9/342; C03B 9/344; C03B 9/347
See application file for complete search history.

(56) References Cited

U.S. PATENT DOCUMENTS

| | | | |
|---|---|---|---|
| 766,768 A | | 8/1904 | Owens |
| 1,307,527 A | * | 6/1919 | Wadsworth ............... C03B 7/18 65/125 |
| 1,554,195 A | | 9/1925 | Bergman |
| 1,576,733 A | | 3/1926 | Ferngren |

(Continued)

FOREIGN PATENT DOCUMENTS

| | | |
|---|---|---|
| DE | 3309990 A1 | 10/1984 |
| FR | 411768 A | 6/1910 |

(Continued)

OTHER PUBLICATIONS

Int. Search Report and Writ Opinion, Int. Serial No. PCT/US2021/052753, Int. Filing Date; Sep. 30, 2021, Applicant: Owens-Brockway Glass Container Inc. Date: Apr. 25, 2022.

(Continued)

*Primary Examiner* — Lisa L Herring

(57) ABSTRACT

A method of providing glass from a glass melting furnace to at least one mold, including providing an uninterrupted glass communication path from an outlet of the glass melting furnace to the at least one mold, and pressurizing the path at a location downstream of the outlet to move molten glass into the at least one mold. A related system, apparatus, and molding equipment are also disclosed.

27 Claims, 11 Drawing Sheets

(56) References Cited

U.S. PATENT DOCUMENTS

| | | | |
|---|---|---|---|
| 1,742,098 A | | 12/1929 | Rankin |
| 1,834,631 A | | 12/1931 | Mulholland |
| 2,046,195 A | * | 6/1936 | Tremblay .................. C03B 7/18 |
| | | | 65/303 |
| 2,053,381 A | | 9/1936 | Stewart |
| 2,061,661 A | * | 11/1936 | Kinker ...................... C03B 7/18 |
| | | | 65/229 |
| 2,063,565 A | * | 12/1936 | Stuckey .................... C03B 7/18 |
| | | | 65/324 |
| 2,175,407 A | * | 10/1939 | Peiler ........................ C03B 7/18 |
| | | | 65/324 |
| 2,210,203 A | | 8/1940 | Duhan |
| 2,290,012 A | | 7/1942 | Barnard et al. |
| 2,310,715 A | * | 2/1943 | Soubier ..................... C03B 7/14 |
| | | | 65/130 |
| 3,160,492 A | * | 12/1964 | Chapman ................ C03B 7/088 |
| | | | 373/28 |
| 4,643,869 A | | 2/1987 | Heimerl et al. |
| 4,690,781 A | | 9/1987 | Heimerl et al. |
| 5,266,093 A | * | 11/1993 | Konishi ................ C03B 9/1936 |
| | | | 65/158 |
| 5,776,221 A | * | 7/1998 | Dembicki ................. C03B 7/16 |
| | | | 65/129 |
| 6,477,862 B1 | | 11/2002 | Wacke |
| 9,212,078 B2 | | 12/2015 | Bratton et al. |
| 9,731,991 B2 | | 8/2017 | Dalstra |
| 9,822,027 B2 | | 11/2017 | Wang et al. |
| 2004/0206125 A1 | | 10/2004 | Schenk et al. |
| 2007/0204654 A1 | | 9/2007 | Fukumoto et al. |
| 2009/0223251 A1 | * | 9/2009 | Tomisaka ............ C03B 19/1005 |
| | | | 65/142 |
| 2011/0197635 A1 | | 8/2011 | McDemott et al. |
| 2014/0116089 A1 | | 5/2014 | Yuasa et al. |
| 2018/0065878 A1 | | 3/2018 | Dalstra |
| 2022/0098076 A1 | | 3/2022 | Holmes et al. |
| 2022/0098078 A1 | | 3/2022 | Rashley et al. |
| 2022/0098081 A1 | | 3/2022 | Rausch et al. |

FOREIGN PATENT DOCUMENTS

| | | |
|---|---|---|
| FR | 474628 A | 3/1915 |
| GB | 281382 | 11/1927 |
| JP | 08059249 A | 8/1994 |
| JP | 08059250 A | 8/1994 |
| JP | 08059248 A | 3/1996 |
| WO | WO2016/176073 A1 | 11/2016 |
| WO | WO2017223034 A1 | 12/2017 |
| WO | 2022072437 A2 | 4/2022 |

OTHER PUBLICATIONS

Chile Informe De Busqueda (Search Report), No. 202300929, Applicant: Owens-Brockway Glass Container Inc., Dated: Oct. 1, 2024.

Chile Informe Pericial (Expert Report), No. 202300929, Applicant: Owens-Brockway Glass Container Inc., Dated: Oct. 1, 2024.

Chilean Informe De Busqueda (Search Report), Serial No. 202300929, Applicant: Owens-Brockway Glass Container Inc., Dated Jan. 14, 2025.

Chilean Respuesta Pericial (Expert Response), Serial No. 202300929, Applicant: Owens-Brockway Glass Container Inc., Dated Jan. 14, 2025.

* cited by examiner

MOLTEN GLASS FEEDING AND MOLDING

TECHNICAL FIELD

This patent application discloses methods and apparatuses for glass container manufacturing and, more particularly, methods and apparatuses for molding glass and for feeding molten glass from a glass feeder to a mold.

BACKGROUND

During glass container manufacturing, molten glass can be melted in a glass melter, which may include a forehearth and a glass feeder. The glass feeder can control the temperature and quantity of molten glass, which can be formed into glass gobs. The glass gobs can be subsequently formed into various products, for example, glass containers, using forming equipment, for example molding equipment. The molding equipment can use various processes to form the glass containers.

BRIEF SUMMARY OF THE DISCLOSURE

The present disclosure embodies a number of aspects that can be implemented separately from or in combination with each other.

An apparatus for providing molten glass, in accordance with one aspect of the disclosure, includes a glass feeder in downstream fluid communication with a glass forehearth, the glass feeder including a conduit configured for directing molten glass from the glass forehearth; and at least one mold configured to receive the molten glass, wherein the glass feeder is configured to provide an uninterrupted glass communication path from an outlet of the glass forehearth to the at least one mold.

A system, in accordance with one aspect of the disclosure, includes a glass furnace including a glass forehearth, and the above-mentioned apparatus for providing molten glass.

A method of providing glass from a glass melting furnace to at least one mold, in accordance with one aspect of the disclosure, includes providing an uninterrupted glass communication path from an outlet of the glass melting furnace to the at least one mold, and pressurizing the path at a location downstream of the outlet to move molten glass into the at least one mold.

A method of molding a glass parison, in accordance with one aspect of the disclosure, includes flowing a molten glass stream along a glass communication path from an outlet of a glass melting furnace to a mold, and pressurizing the glass communication path at a location downstream of the outlet to advance molten glass into the mold to establish a molten glass charge in the mold. Thereafter, the method also includes stopping advancement of the molten glass into the mold before the molten glass fills the mold and, thereafter, separating the molten glass charge in the mold from the molten glass upstream of the mold.

A glass parison molding apparatus, in accordance with another aspect of the disclosure, includes a mold including mold sections openable and closeable with respect to one another and having through passage portions extending between lower and upper ends and neck ring interlock features, and a neck ring assembly. The neck ring assembly includes neck ring sections openable and closeable with respect to one another and having mold body ends with axially facing end surfaces, radially inwardly facing neck finish forming portions, mold body interlock features, guide body midsections with guide hub pockets and guide slot portions, and plunger ends with annular extending walls establishing a plunger sleeve counterbore. The neck ring assembly also includes a guide ring including a neck finish forming hub carried in the guide hub pockets of the neck ring sections and having a throughbore and a counterbore, and a guide flange carried in the guide slot portions of the neck ring sections. The apparatus further includes a plunger sleeve having a wall establishing a plunger passage and including a neck ring section that extends axially into the plunger sleeve counterbore of the neck ring, and a plunger in the plunger passage of the plunger sleeve and movable axially along the plunger sleeve. The plunger includes a neck ring shoulder, wherein the neck ring section of the plunger sleeve is located radially between the neck ring shoulder of the plunger and the annular extending walls of the plunger ends of the neck ring sections when the plunger is in a fully advanced position relative to the mold.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
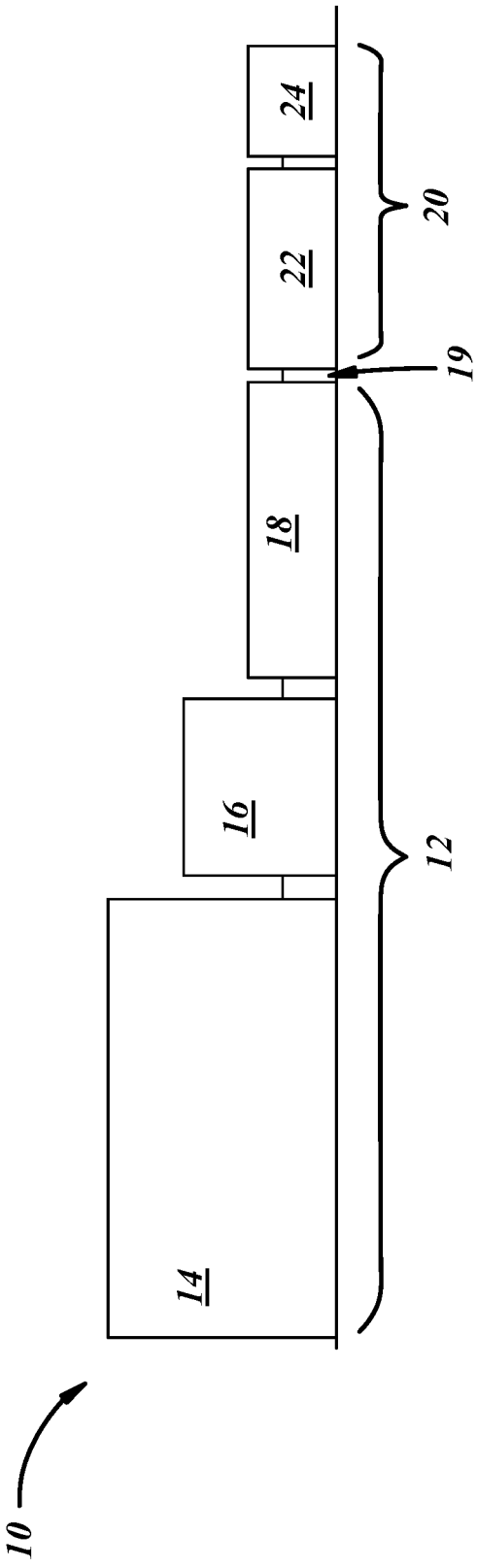
FIG. 1 is a schematic view illustrating a system for providing an uninterrupted glass communication path including a glass furnace and an apparatus in fluid communication with the glass furnace, in accordance with an illustrative embodiment of the present disclosure.

In accordance with at least one aspect of the disclosure, an apparatus, system, and method is provided for flowing molten glass from a glass feeder to at least one mold through a conduit.

Silica-based glass (soda-lime-silica glass) as well as other types of glass are prevalent in the manufacture of glass containers and other articles. Molten glass used to make such articles can be prepared by reacting and melting a batch of glass-forming materials in a refractory lined, continuously operated glass furnace, tank, and/or pot. The batch of glass-forming materials can typically be introduced into the furnace by being deposited into a pool of molten glass already in the furnace. The batch is gradually melted into the pool by continuous application of heat. After the batch has been melted, refined, and homogenized within the furnace, the resulting molten glass can typically be directed to a forehearth, where it can be thermally conditioned by being cooled to a suitable temperature for forming. A feeder located at a downstream end of the forehearth can be used to measure out predetermined amounts of molten glass known as "gobs," which may be delivered to a mold using gravity. The gobs may then be formed into individual glass articles using a glass forming machine.

Equipment for forming glass gobs or glass blanks can require valuable space in a system, building, or plant because the equipment generally requires gravity to feed a glass gob to a forming machine, thus requiring vertical space. Additionally, equipment for forming glass containers may involve glass-to-metal contact, for example funnels, distributors, troughs, deflectors, chutes, and the like. This glass-on-metal contact can create commercial variations in the glass gobs, blanks, and/or containers, which can be undesirable.

Further, some suction feed forming systems use vacuum alone to fill a blank mold, which may be in contact with a relatively large open surface of molten glass in an open pot. However, using an open pot can lead to large energy losses from the open surface of the molten glass, and a cold spot can remain on the surface of the glass each time the blank mold touches the molten glass surface. Using an open pot can also lead to commercial variations in a final glass container.

When vacuum alone does not provide enough pressure to fill the blank mold, additional pressure may be applied to a glass stream to overcome friction and gravity. Yet, applying pressure should be in a direction of the blank mold and not in a direction of a forehearth because it may create an undesirable intermittent rise in molten glass level or a wave in the forehearth. A one-way valve may be utilized to prevent backflow, but a valve for immersion in molten glass may result in excessive wear.

Consequently, the present disclosure is directed to a system, apparatus, and method that provides an uninterrupted glass communication path from a glass melting furnace through a glass feeder including a conduit directly into at least one mold, which can eliminate a need for at least some delivery equipment reducing the associated large height requirements and also reducing or eliminating commercial variations due to glass-on-metal contact.

The disclosed apparatus, system, and method do not require a large height difference between a glass forehearth and the corresponding mold(s) as in other systems because a molten glass level in the glass forehearth can be at a same or similar height level as in the mold(s). Additionally, the need for many components in gob feeding systems (e.g., a combination of funnels, distributors, troughs, and deflectors) can be eliminated, thus minimizing the amount of vertical space needed. Also, the apparatus and system herein enable the furnace and/or forehearth to be built at ground level, which increases safety of the apparatus and system (e.g., reduced threat of dropping glass). Moreover, the system and apparatus can be configured to minimize energy loss, cold spots on the surface of the molten glass, and equipment and maintenance costs. Finally, the apparatus, system, and/or method of the present disclosure may facilitate supply of a more uniform distribution of glass throughout walls of a glass container that may, in turn, enable a reduction in wall thickness of the glass container.

FIG. 1 illustrates a system 10 for providing an uninterrupted glass communication path. The system 10 can include a glass furnace 12 for melting glass for forming glass containers and/or other glass articles, for example. The glass furnace 12 can further include a melter 14, a molten glass conditioner 16, and/or a glass forehearth 18 coupled in fluid communication. In an embodiment, the conditioner 16 and the forehearth 18 may be parts of a single apparatus. Additionally, the system 10 can include an apparatus 20 for providing molten glass, which can further include a glass feeder 22, and at least one mold 24 fluidly coupled to the glass feeder 22. The glass feeder 22 can be in downstream fluid communication with the glass forehearth 18, where the glass feeder 22 can include an uninterrupted glass communication path from an outlet 19 of the forehearth 18 to the at least one mold 24.

Shown in FIG. 1, the glass melter 14 can include a melter where a glass batch is fed at a slow, controlled rate using a batch processing system. For example, the glass melter 14 may include a submerged combustion melter (SCM) or other suitable type of a furnace/melter for melting glass. The SCM can include submerged combustion burners mounted in floors or sidewalls of the SCM that fire fuel and oxidant mixtures directly into and under the surface of molten glass in the SCM. The fuel and oxidant mixtures can then combust to provide heat for melting the glass batch.

The conditioner 16 can be in fluid communication with the glass melter 14 and can condition molten glass from the glass melter 14. For example, the conditioner 16 can remove foam or gas bubbles from the bulk of the molten glass caused by the melting process. In any case, the conditioner 16 may include a finer, refiner, or any other apparatus suitable to condition molten glass.

Also shown in FIG. 1, the glass furnace 12 can include the glass forehearth 18 in fluid communication with the glass melter 14 and/or the conditioner 16. The forehearth 18 can include a refractory channel through which fined molten glass received from the conditioner 16 can flow. The forehearth 18 can be configured to condition and heat/cool the molten glass to a uniform temperature and viscosity suitable for downstream forming operations. As used herein, the term "forehearth" includes any chamber, vessel, container, or the like to hold and convey molten glass therein and therethrough.

Figure 2:
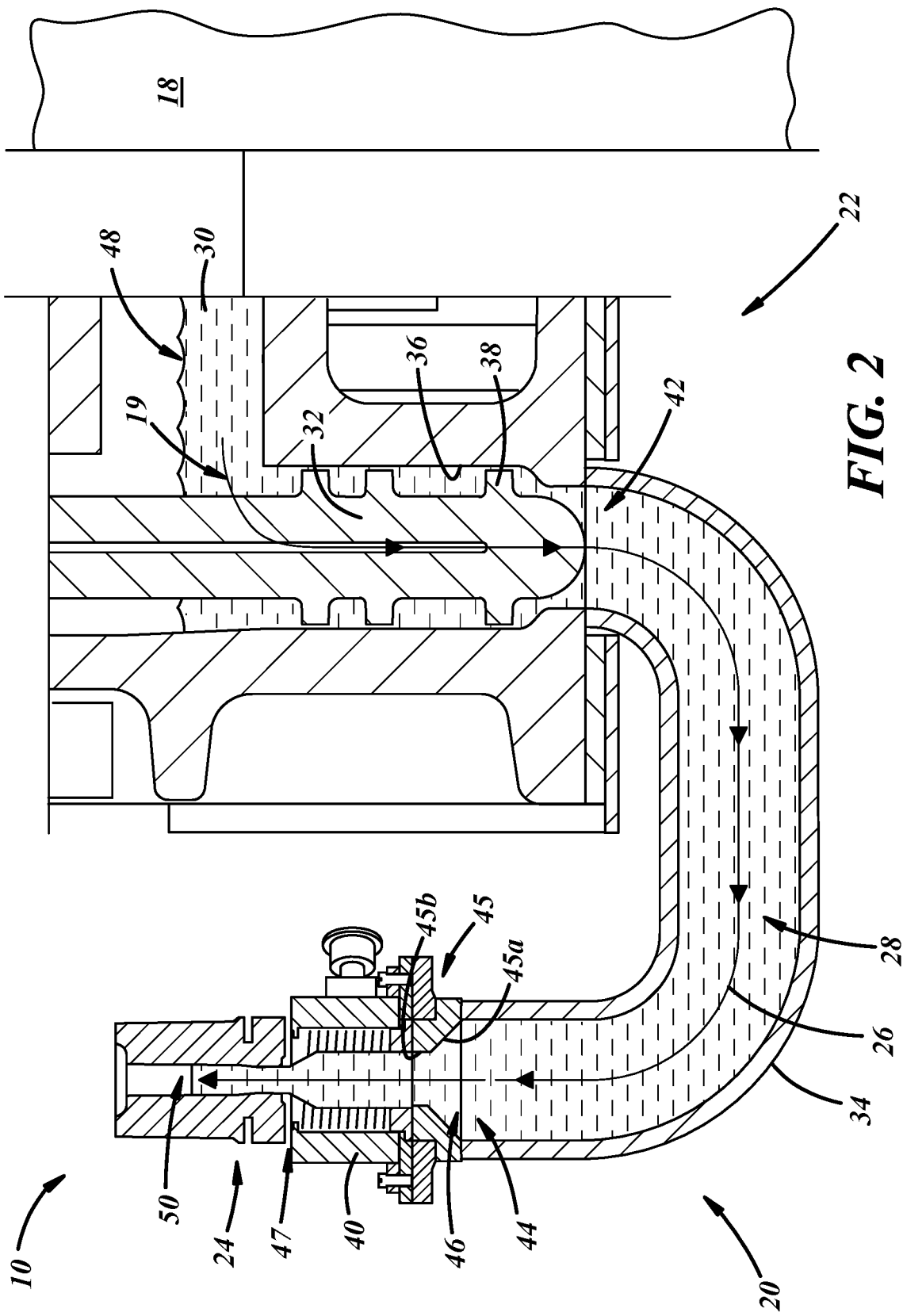
FIG. 2 is a schematic cross-sectional view illustrating the apparatus shown in FIG. 1 having a circumferentially closed conduit for delivering molten glass to at least one mold, in accordance with an illustrative embodiment of the present disclosure.

FIG. 2 illustrates an embodiment of the apparatus 20 for providing an uninterrupted glass communication path 26 and/or flowing molten glass to the at least one mold 24, in accordance with an illustrative embodiment of the present disclosure. The apparatus 10 can include the glass feeder 22, which can be fluidly and/or mechanically coupled to the glass forehearth 18. The glass feeder 22 can be configured for receiving molten glass from the forehearth 18 and dispensing the molten glass in a desired quantity to the at least one mold 24. In some instances, the glass feeder 22 may comprise a heater (e.g., induction, electrical resistance, gas flame, or microwave) for melting glass and/or maintaining temperature of a glass melt.

An uninterrupted glass communication path 26 may include a fluid path along which a molten glass stream 28 can flow from the glass forehearth 18 to the at least one mold 24. The uninterrupted glass communication path can allow the molten glass stream 28 to have continuity along the path, for example a direct and unimpeded molten glass stream 28 with minimal air gaps, for example, less than 5 mm. Along the uninterrupted glass communication path, the molten glass stream 28 can be subject to continuous and/or intermittent application of pressure and/or flow, can have different viscosities along the path 26, and/or can be in steady-state flow. The embodiments herein illustrate some examples of the molten glass stream 28 flowing along an uninterrupted glass communication path 26. As used herein, the term "uninterrupted" means that there are no valves or similar flow blocking members in the communication path from a forehearth and/or a glass feeder to a mold. Such flow blocking members do not include shears configured to separate and shear molten glass or any other device(s) suitable to separate a molten glass mold charge from a molten glass stream.

Illustrated in FIG. 2, the glass feeder 22 may include a feeder plunger 32 configured to provide extrusion force and dispense the molten glass 30 received from the glass forehearth 18. In the embodiment shown in FIG. 2, molten glass 30 can be moved to a conduit 34 in a downward direction from the feeder plunger 32, although it will be appreciated that the molten glass can be moved in other configurations (e.g., horizontally). The feeder plunger 32 can be moved downward through, lifted from, and/or rotated within a tube 36 or conduit-shaped segment of the forehearth 18 and/or the glass feeder 22 to control the flow of the molten glass stream 28. The feeder plunger 32 may be reversible, reciprocable, and/or retractable so that the flow of the molten glass stream 28 can be slowed, stopped, and/or reversed. In one example, the feeder plunger 32 may include a reciprocable and/or oscillating plunger. In this example, the feeder plunger 32 may include at least one plunger flange 38 disposed (e.g., circumferentially) around the plunger 32, which, when the plunger 32 is moved, provides pumping action to the molten glass 30. In another example, the feeder plunger 32 may include a screw plunger that can be rotated and/or axially reciprocated to obtain a forward, net zero, and/or reverse molten glass flow. When the screw plunger is used, the plunger may include threads that at least partially create an expelling force to the molten glass 30 as the plunger is rotated. It will be appreciated that the feeder plunger 32 may include other suitable types of plungers, for example a stirring-type plunger (e.g., having paddles or blades) and/or a smooth cylinder plunger (e.g., having no threads, paddles, or blades).

With continued reference to FIG. 2, the glass feeder 22 can include the conduit 34 configured to receive molten glass moved by the feeder plunger 32 and to direct the molten glass along the uninterrupted glass communication path 26 to at least one orifice 40 in fluid communication with the conduit 34. The conduit 34 may include a pipe, channel, or other path for conveying the molten glass 30, having an entrance 42 and an exit 44 through which the molten glass 30 can flow uninterrupted as the feeder plunger 32 moves the molten glass 30. In the example depicted in FIG. 2, the conduit 34 can include a circumferentially-closed conduit having straight and curved segments that, when combined, extend approximately 180° (e.g. between 135° and 225° including all ranges, sub-ranges, endpoints, and values in that range) from the conduit entrance 42 to the conduit exit 44, at which location the flow of the molten glass stream 28 is upward. As used herein, the terms upward and upwardly include at an angle anywhere between plus or minus 45° from vertical. In another example, the conduit 34 may include a circumferentially-closed conduit that is continuously curved from the entrance 42 to the orifice 40 and may not include any straight segments. In another example, the conduit 34 may be substantially straight and/or horizontally-oriented. It is contemplated that the conduit 34 may include other suitable configurations and arrangements for directing the molten glass stream 28.

The path 26 may have a variable transverse cross-sectional area, for instance, to account for head losses and to achieve a desirable mass flow rate. For example, as shown in FIG. 2, the path 26 may neck down at a location relatively distal with respect to the forehearth 18 and relatively proximate with respect to the mold 24. More specifically, the path 26 may include a reduced diameter adapter 45 between an end 46 of the conduit 34 and an inlet of the orifice 40. The adapter 45 may be necked down such that it has a conical upstream portion 45a and a cylindrical downstream portion 45b, as illustrated, or any other geometry and/or size suitable to facilitate desired mass flow rate of glass along the path 26. Likewise, the orifice 40 may be necked down at a downstream end thereof according to a conical shape, as illustrated, or according to any other shape and/or size suitable to facilitate desired mass flow rate of glass along the path 26. The necked down portion of the path 26 may include sequential necked down portions of a downstream end of the conduit 34, and a necked down portion of the orifice 40 at a downstream end thereof.

FIG. 2 illustrates the orifice 40 coupled to and in fluid communication with the exit 44 of the conduit 34. It will be appreciated that more than one conduit may be used. "Orifice" is a term of art and includes a device through which molten glass passes and that controls or influences some quality or characteristic of the molten glass passing therethrough. In one example, a glass feeder orifice may include an affirmatively heated, metal, cylindrical device that may be resistance-heated, induction-heated, or heated in any other suitable manner. In another example, a glass feeder orifice may include a ceramic ring having a precision-sized inner diameter to control an outer diameter of molten glass flowing therethrough. In any case, the orifice 40 can be integrally formed with and/or coupled to the conduit 34 and can include an opening through which the molten glass stream 28 from the conduit 34 can flow into the at least one mold 24. The orifice 40 may provide a constant and/or measured flow of the molten glass stream 28 to the at least one mold 24. In some instances, the orifice 40 may provide heat and/or cooling to the molten glass stream 28. For example, the orifice 40 may comprise a heating device for providing heat to the molten glass, for example, to reduce viscosity of the molten glass. In another example, the orifice 40 may include a cooling jacket for providing cooling to increase viscosity of the molten glass. Additionally, the orifice 40 may include a variety of cross-sectional shapes and/or configurations, for example circular, elliptical, square, triangular, oval, and so forth. The orifice 40 may be an individual component or may be integral with and/or incorporated into the end 46 of the conduit 34. When provided as an individual component, the orifice 40 may be configured to be replaced and/or exchanged to control the flow rate of the molten glass stream 28 using different diameters or shapes. The orifice 40 can comprise a variety of materials, for example a platinum-heated orifice, a molybdenum orifice, or a coated molybdenum orifice.

Depending on the materials used for the orifice 40 and for the mold 24, an air gap 47 (shown exaggerated in size) may be provided between an outlet end of the orifice 40 and an inlet end of the mold 24. For example, when the mold 24 is composed of Inconel, and the orifice 40 is composed of platinum, then the respective ends of the mold 24 and the orifice 40 can be in direct contact, such that an air gap is unnecessary. But, in another example, when the orifice 40 is composed of platinum and the mold 24 is composed of iron and the respective ends are in direct contact with one another, an alloy forms at the interface. The alloy has a melting temperature below the operating temperature of the orifice 40, such that the orifice 40 will begin to erode, melt, or otherwise fail. To prevent this from happening, the air gap 47 can be provided between the respective ends of the orifice 40 and the mold 24 in a range between 0.01 mm and 5 mm, including all ranges, sub-ranges, values, and endpoints of that range. In operation, molten glass should not leak out of the air gap 47 because, following the path of least resistance, molten glass will flow upwardly into the mold under vacuum pulled from a location downstream of the air gap 47. In another embodiment, a sleeve or other surrounding structure could be provided around the outlet end of the orifice 40 and the inlet end of the mold 24 to prevent or inhibit leakage of molten glass through the air gap 47. The geometry of the sleeve would correspond to the geometry of the mold 24 and the orifice 40 (i.e. straight cylindrical, stepped cylindrical, or the like) and would be composed of Inconel or any other material suitable to avoid erosion, melting, or failure of the orifice 40. In an additional embodiment, an insulator, for instance, a thermal gasket, may be provided between the respective ends of the orifice 40 and the mold 24 to prevent or inhibit leakage of molten glass between the mold 24 and the orifice 40.

In the embodiment shown in FIG. 2, the orifice 40 can be configured so that the molten glass stream 28 flows upwardly into the mold 24. It will be appreciated that the orifice 40 may include other arrangements. For example, the orifice 40 may be oriented so that the molten glass stream 28 flows at an angle (e.g., 45° from vertical) into the mold 24.

In some instances, the orifice 40 can be disposed at a height of a molten glass level 48 (e.g., an open free surface) in the glass forehearth 18. This may prevent accidental glass flow through the orifice 40 from excess head pressure in the conduit 34. In other instances, the orifice 40 can be located above or below the molten glass level 48 in the glass forehearth 18, which can also serve to at least partially regulate flow rate of the molten glass stream 28 using negative and/or positive pressure, respectively. In the illustrated embodiment of FIG. 2, the orifice 40 is shown below the glass level 48. It will be appreciated that the orifice 40 may include other suitable materials and configurations.

With continued reference to FIG. 2, the apparatus 10 can include the mold 24. The mold 24 may include, for example, a parison mold and/or a blank mold and can be in fluid communication with and configured to couple to and/or abut the conduit 34 and/or the orifice 40. Additionally, the mold 24 can be configured to be removable/repositionable.

In the implementation illustrated in FIG. 2, the mold 24 may be oriented so that the molten glass stream 28 can flow from the orifice 40 upward into the mold 24 and a cavity or chamber 50 of the mold 24. Such an upright orientation, with a neck and neck finish portion of the mold 24 above a body portion of the mold 24, is in contrast with some types of molds that are oriented such that neck and neck finish portions of the molds are below body portions of the molds and such that molten glass is received downwardly into such molds. In some sense, therefore, the mold 24 might be considered "inverted" from such prior mold configurations. The same goes for the orifice 40. In any event, the mold 24 and/or the orifice 40 may be in any orientation; right-side up, upside down, inverted, etc. The cavity 50 can include space within the mold 24 into which the molten glass stream 28 can be at least partially formed into a glass container. Once a pre-determined amount of molten glass has been dispensed upwardly into the mold 24, the feeder plunger 32 can be stopped, reversed, and/or retracted to control the flow of the molten glass stream 28. In some instances, as the feeder plunger 32 is stopped and/or reversed, the mold 24 may be lifted away and/or removed from the orifice 40 and/or the conduit 34 in order to neck down the molten glass in the mold 24 from the molten glass stream 28 in the conduit 34.

Figure 3:
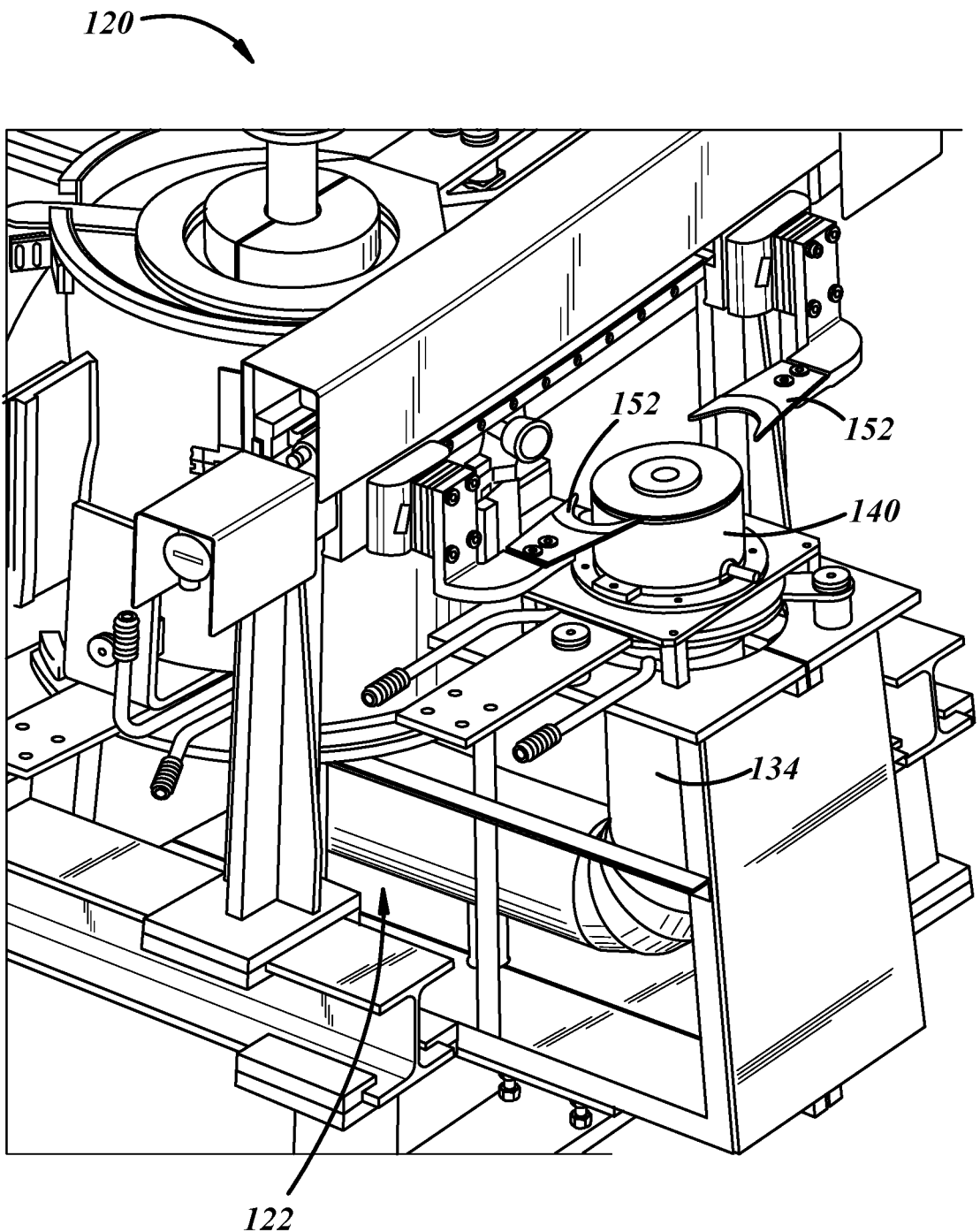
FIG. 3 is an isometric view illustrating the apparatus in FIG. 2 including the conduit for delivering molten glass, an orifice downstream of the conduit, and a separation device, in accordance with an illustrative embodiment of the present disclosure.
Figure 4:
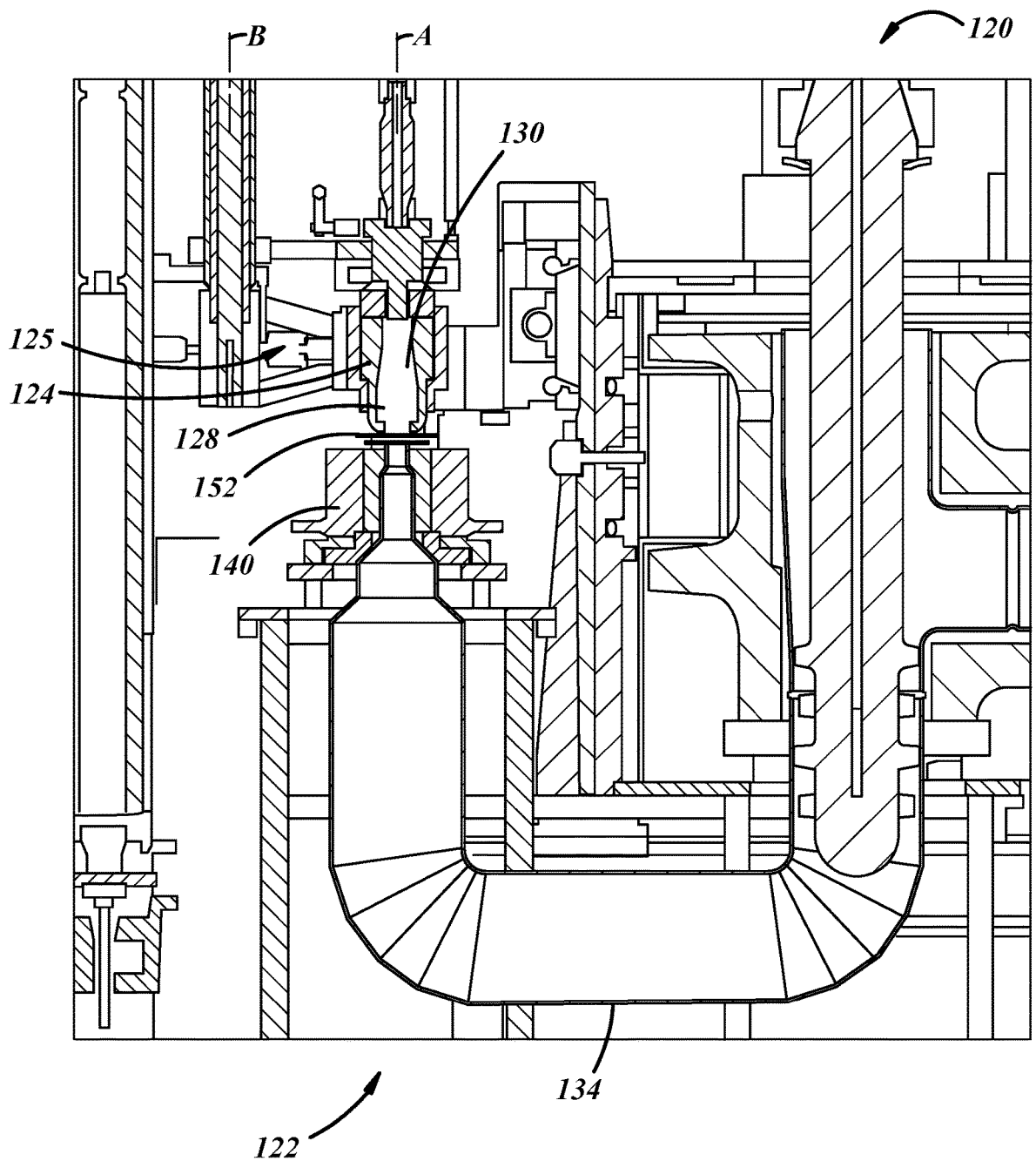
FIG. 4 is a schematic cross-sectional view illustrating the apparatus in FIGS. 2 and 3, including the conduit, the orifice, the separation device, and the at least one mold, in accordance with an illustrative embodiment of the present disclosure.

With reference now to FIGS. 3 and 4, an apparatus 120 can comprise a glass feeder 122 having a separation device 152. These embodiments are similar in many respects to the embodiment of FIGS. 1 and 2, and like numerals among the embodiments generally designate like or corresponding elements throughout the several views of the drawing figures. Accordingly, the descriptions of the embodiments are incorporated into one another, and description of subject matter common to the embodiments generally may not be repeated here.

As illustrated in FIGS. 3 and 4, the separation device 152 may be used to separate a molten glass charge in a mold 124 (FIG. 4) from a molten glass stream. In one example, the separation device 152 can include shears configured to separate and shear the glass. In other examples, the separation device 152 may include a focused laser beam, a high-pressure water jet, and/or any other device(s) suitable to separate the molten glass charge from the molten glass stream. The separation device 152 may separate the molten glass disposed in the mold 124 (FIG. 4) from the molten glass stream prior to and/or while the mold 124 (FIG. 4) is lifted or otherwise moved away from a mold-charging position over a conduit 134 and/or an orifice 140.

With reference to FIG. 4, the mold 124 may be moved by any equipment suitable to move a glass mold. For example, one or more mold arms 125 may be coupled to the mold 124 so as to move the entire mold 124 away from its mold-charging position over the conduit 134 and/or the orifice 140, and/or so as to open sections or halves of the mold 124 away from one another to release a parison formed in the mold 124. In turn, the mold arms 125 may be moved by one or more pneumatic, hydraulic, and/or electric cylinders or other actuators that may be part of mold transport equipment that may be used to open the mold 124, and/or move the mold 124 to and away from its mold-charging position. In the illustrated example, the mold 124 may be rotated about an axis B that is offset from but parallel to a longitudinal axis A of the mold 124. Also, or instead, the mold 124 may be translated to and away from its mold-charging position.

In any event, when the mold 124 is moved, a gather or charge of molten glass in the mold 124 tends to be retained in the mold 124 because of the glass viscosity, glass surface tension, glass friction against the mold 124, vacuum pulled through the mold 124, a neck ring of the mold 124 holding a neck portion of the gather/charge, and/or geometry of the mold 124. This is also true once the molten glass stream is severed from the mold gather/charge inside the mold 124. After a desired amount of molten glass is gathered in the mold 124, the mold transport equipment moves the mold 124, the separation device 152 severs the molten glass stream, a blank plunger retracts, a baffle (not shown) then moves into place under the mold 124 to close the mold 124, and air or other gas is blown around the blank plunger and into the gather/charge to define a glass blank or parison against the blank mold 124. Thereafter, the mold 124 may be opened, whereafter the parison is suspended by the neck ring, and then the parison may be slightly blown again in open air according to a parison puff operation. In any case, the parison is transferred to a downstream blow mold station (not shown) to be blown into final container shape against a blow mold (not shown) in accordance with any equipment and techniques suitable to produce a glass container. Those of ordinary skill in the art would recognize that the baffle (not shown) may be moved by the mold transport equipment and/or any other pneumatic, hydraulic, and/or electric cylinders or other actuators suitable to move a blank mold baffle.

Figure 5:
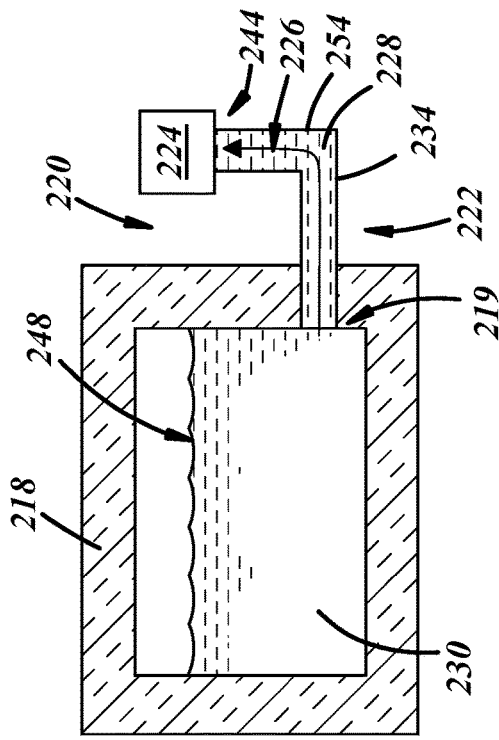
FIG. 5 is a schematic cross-sectional view illustrating an apparatus including a glass forehearth and a conduit, in the form of a riser pipe, for delivering molten glass to at least one mold, in accordance with another illustrative embodiment of the present disclosure.

With reference now to FIG. 5, an apparatus 220 including a glass feeder 222 are shown for providing an uninterrupted glass communication path 226. This embodiment is similar in many respects to the embodiments of FIGS. 1 through 4, and like numerals among the embodiments generally designate like or corresponding elements throughout the several views of the drawing figures. Accordingly, the descriptions of the embodiments are incorporated into one another, and description of subject matter common to the embodiments generally may not be repeated here.

The apparatus 220, as shown in FIG. 5, may not include a feeder plunger and may rely on hydraulic pressure and/or some other means for flowing a molten glass stream 228. The glass feeder 222 can include a conduit 234 that comprises a feeder riser pipe 254, which may be coupled to and/or be in fluid communication with a glass forehearth 218 having molten glass 230. The feeder riser pipe 254 may extend from a forehearth outlet 219 to a conduit exit 244 (e.g., approximately 90°), at which location the molten glass stream 228 can flow upward into a mold 224. In some instances, the conduit exit 244 may be located below/underneath a molten glass level 248 in the glass forehearth 218, which can provide a pressure differential for flowing the molten glass stream 228 through the conduit 234. It is contemplated that the conduit exit 244 may also be disposed at or above the molten glass level 248 and, in some instances, a pressure at the conduit exit 244 may be substantially the same or less than a pressure at the molten glass level 248 in the glass forehearth 218.

Figure 6:
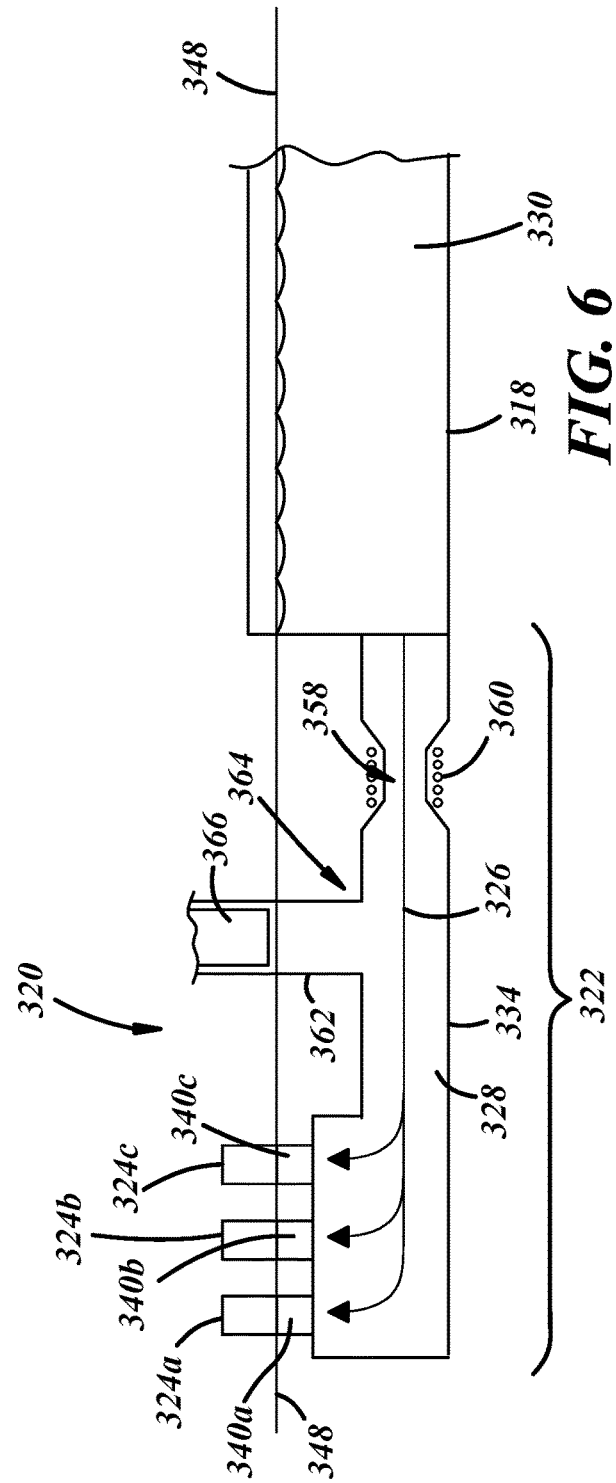
FIG. 6 is a schematic cross-sectional view illustrating an apparatus having a conduit for delivering molten glass to several molds, where the conduit includes a throat and a vertical riser pipe in communication with pressure means, in accordance with an illustrative embodiment of the present disclosure.

With reference now to FIG. 6, a forehearth 318 is illustrated having molten glass 330 and an apparatus 320 in glass communication with the forehearth 318 for providing an uninterrupted glass communication path 326, where a molten glass stream 328 can be fed through a horizontal conduit 334 to at least one mold 324a, 324b, 324c. This embodiment is similar in many respects to the embodiments of FIGS. 1 through 5, and like numerals among the embodiments generally designate like or corresponding elements throughout the several views of the drawing figures. Accordingly, the descriptions of the embodiments are incorporated into one another, and description of subject matter common to the embodiments generally may not be repeated here.

In FIG. 6, the apparatus 320 can be coupled to and/or in fluid communication with the forehearth 318 and can include a glass feeder 322 and the horizontally arranged conduit 334 through which the molten glass stream 328 can flow from the forehearth 318 to at least one orifice 340a, 340b, 340c along the uninterrupted glass communication path 326. A molten glass level 348 in the forehearth 318 may be the same or about the same height as an outlet of the at least one orifice 340a, 340b, 340c and/or an inlet of the mold 324a, 324b, 324c. In one example, the level 348 may be within plus or minus 0 to 5 millimeters including all ranges, sub-ranges, endpoints, and values in that range. Three orifices 340a, 340b, 340c are shown configured for providing the molten glass stream 328 to respective molds 324a, 324b, 324c. However, it is contemplated that the glass feeder 322 may include other numbers of orifices (e.g., one orifice, two orifices, four orifices, and so forth).

FIG. 6 illustrates the conduit 334 including a throat 358 disposed between the forehearth 318 and the molds 324a, 324b, 324c. The throat 358 can be integrally formed with the conduit 334 and can have a reduced cross-sectional area compared with a remaining portion of the conduit 334. The throat 358 can be configured to provide a flow resistance to the molten glass stream 328 within the conduit 334. In some instances, the flow resistance can be passively provided by the throat 358 using the reduced cross-sectional area and/or a pre-determined length of the throat 358. In other instances, the flow resistance to flowing the molten glass stream 328 within the conduit 334 can be actively provided, for example, using a heating or cooling thermal device 360 in addition to or instead of the reduced cross-sectional area.

In an example, the thermal device 360 can include an inductive heater configured to cycle on and off. When turned on, the inductive heater can provide heat to the throat 358 and to the molten glass stream 328 within the throat 358, which can decrease viscosity and flow resistance of the molten glass stream 328. When turned off, the thermal device 360 does not provide heat to the throat 358 or the molten glass stream 328 within the throat 358, and the molten glass stream 328 can cool, thus increasing viscosity and flow resistance. Any other suitable type of thermal device may be used, for example gas burners, resistance heaters, or the like. Additionally, the conduit 334 may include cooled walls, for example, fluid-cooled jackets, more specifically, water-cooled or air-cooled jackets. Those of ordinary skill in the art are familiar with cooling of equipment that carries molten glass and will recognize the aforementioned techniques and equipment and other techniques and equipment suitable for cooling the conduit.

Referring to FIG. 6, a riser 362 can be coupled to the conduit 334 at a location 364 between the throat 358 and the orifices 340a, 340b, 340c. The riser 362 can include and/or be in communication with a pressure device 366 configured for providing continuous and/or intermittent pressure to the molten glass stream 328 in the conduit 334. The pressure can at least partially create a pressure differential to flow the molten glass stream 328 in the conduit 334 to the orifices 340a, 340b, 340c and/or the molds 324a, 324b, 324c.

In one embodiment, the pressure device 366 may include a plunger mounted in the riser 362. The plunger can act (e.g., push) on the molten glass stream 328 in the conduit 334 and provide pressure to flow the molten glass stream 328 in a direction toward the orifices 340a, 340b, 340c and the molds 324a, 324b, 324c. As the plunger provides pressure, the throat 358 may also provide flow resistance, thus causing the molten glass stream 328 to flow in a direction with less pressure and/or flow resistances toward the molds 324a, 324b, 324c.

In another embodiment, the pressure device 366 may include an air source and/or a vacuum source. In this embodiment, the air source and/or the vacuum source can act on the molten glass stream 328 by providing pressurized air or other suitable gas and/or a vacuum. The pressurized air and/or gas vacuum can provide a pressure differential in the molten glass stream 328 in the conduit 334 between the riser 362 and the orifices 340a, 340b, 340c and control flow of the molten glass stream 328 toward or from the orifices 340a, 340b, 340c, respectively.

In an implementation of the apparatus 320 including the glass feeder 322 shown in FIG. 6, the molten glass stream 328 can flow from the forehearth 318 through the conduit 334. As the molten glass stream 328 flows through the conduit 334, it flows through the throat 358, which can provide flow resistance to the molten glass stream 328. The molten glass stream 328 can then flow from the throat 358 and through the orifices 340a, 340b, 340c and into respective molds 324a, 324b, 324c. When pressure is applied to the molten glass stream 328 by the pressure device 366, the pressure can cause the molten glass stream 328 to flow in the conduit 334 toward and through the orifices 340a, 340b, 340c. Because the throat 358 restricts flow, e.g., is smaller in cross-sectional area than the conduit 334 from the throat 358 to the orifices 340a, 340b, 340c, the flow resistance causes a greater pressure between the forehearth 318 and the throat 358 than between the throat 358 and the orifices 340a, 340b, 340c. Lower pressure between the throat 358 and the orifices 340a, 340b, 340c causes most or all of the molten glass stream 328 to flow toward the orifices 340a, 340b, 340c instead of flowing through the throat 358 and toward the forehearth 318. The direction of flow caused by the pressure differential allows for the uninterrupted glass communication path 326 from the forehearth 318 through the conduit 334 and the orifices 340a, 340b, 340c.

Figure 7:
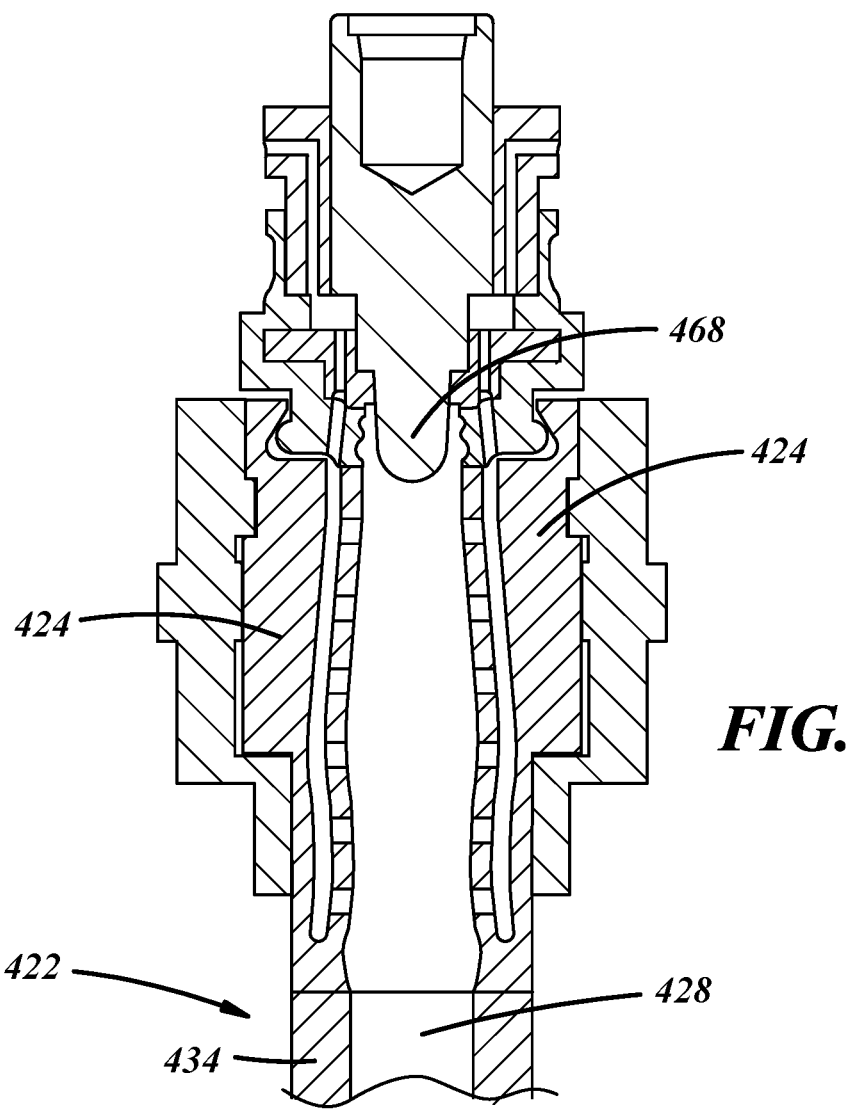
FIG. 7 is a schematic cross-sectional view illustrating a blank plunger, a neck ring, and a mold positioned for receiving molten glass from conduit, in accordance with an illustrative embodiment of the present disclosure.
Figure 8:
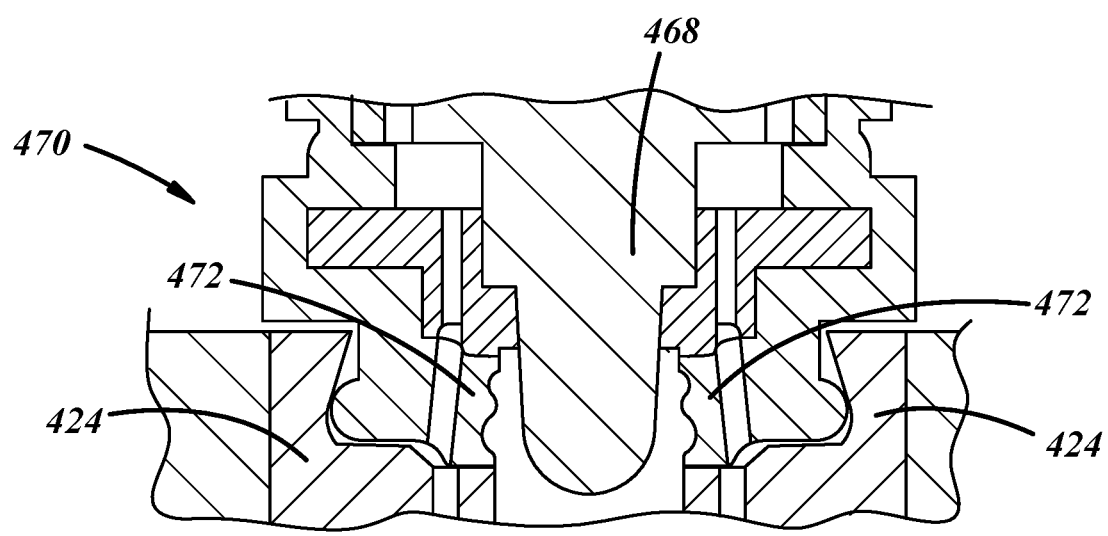
FIG. 8 is an enlarged schematic cross-sectional view illustrating a portion of the blank plunger, neck ring, and the mold of FIG. 7.

With reference now to FIGS. 7 and 8, another embodiment of a glass feeder 422 (FIG. 7) and molding equipment is illustrated. This embodiment is similar in many respects to the embodiment of FIGS. 1 through 6, and like numerals among the embodiments generally designate like or corresponding elements throughout the several views of the drawing figures. Accordingly, the descriptions of the embodiments are incorporated into one another, and description of subject matter common to the embodiments generally may not be repeated here.

In the embodiment shown in FIG. 7, a mold 424 can be positionable directly against a conduit 434 of the glass feeder 422, from which a molten glass stream 428 can directly flow upwardly into the mold 424. Alternatively, as discussed with respect to other embodiments disclosed herein, an orifice could be interposed between the glass feeder conduit 434 and the mold 424. In any case, the mold 424 can be configured to include and/or receive a blow-and-blow blank plunger 468 for at least partially forming a glass container from a charge of glass received from the molten glass stream 428. In some embodiments, the mold 424 can be lifted from the conduit 434, the molten glass in the mold 424 can be sheared, and the mold 424 can then be closed and/or moved. The resulting glass charge, blank, and/or parison may then be transferred to a final or downstream molding station (e.g., a blow mold). In some embodiments, the final or downstream molding station can be moved instead to receive the glass charge, blank, and/or parison formed by the mold 424.

FIG. 8 illustrates the blank plunger 468 shown in FIG. 7 positioned against a neck ring 472 at one end 470 of the mold 424 to create a vacuum seal. A portion of the blank plunger 468 can be configured for at least partially forming a neck of a parison using the neck ring 472.

Figure 9:
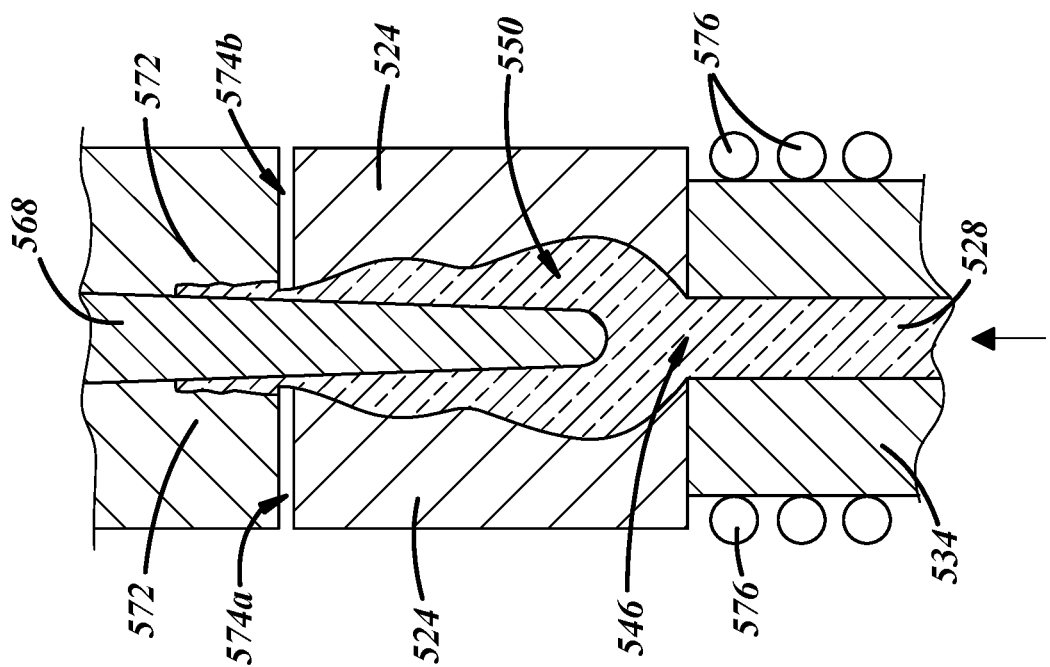
FIG. 9 is a schematic cross-sectional view illustrating a neck ring and a mold receiving a charge of molten glass from a conduit, where the mold includes at least one vacuum passage, in accordance with an illustrative embodiment of the present disclosure.

FIG. 9 illustrates an embodiment of a mold 524 that includes a press-and-blow blank plunger 568 positioned partially in a chamber 550 of the mold 524. This embodiment is similar in many respects to the embodiment of FIGS. 1 through 8, and like numerals among the embodiments generally designate like or corresponding elements throughout the several views of the drawing figures. Accordingly, the descriptions of the embodiments are incorporated into one another, and description of subject matter common to the embodiments generally may not be repeated here.

In the embodiment in FIG. 9, the mold 524 can include a plurality of vacuum passages 574a, 574b formed within the mold 524 for providing a vacuum to the chamber 550. The vacuum provided through the vacuum passages 574a, 574b can at least partially serve to draw a molten glass charge from a molten glass stream 528 into the chamber 550 and against a wall of the chamber 550 for at least partially forming a glass article and/or a parison. A portion of the mold 524 may also include a neck ring 572 for forming a neck finish on the glass article and/or the parison. The vacuum passages 574a, 574b can be provided between the mold 524 and the neck ring 572, and/or through the neck ring 572 and/or the mold 524. Those of ordinary skill in the art will recognize that, according to the present disclosure, molten glass can be extruded into the mold 524 from a location below the mold 524 (with or without the neck ring 572 in position) and instead of supplying a glass gob into the mold 524 from a location above the mold 524.

Additionally, in this embodiment, a separate orifice need not be used; rather a downstream end 546 of the conduit 534 may incorporate structural and/or functional features of an orifice. FIG. 9 illustrates a temperature regulating device 576 coupled and/or disposed proximate to at least a portion of the downstream end 546 of the conduit 534 for heating and/or cooling the end 546. Temperature-regulating the end 546 can serve to maintain temperature of and/or provide a homogenous temperature profile to the molten glass stream 528 passing through the end 546. In one example, the temperature regulating device 576 can include an electrical resistance heater, where heating elements and/or coils are disposed outside but proximate to the end 546. In another example, the temperature regulating device 576 can be integrally formed with the conduit 534 (e.g., the conduit 534 and the temperature regulating device 576 comprises platinum through which an electrical current is passed). In another example, the temperature regulating device 576 can include a microwave heater. In other examples, the temperature regulating device 576 can include other suitable heater types, a cooling device (e.g., cooling coils), or other temperature regulating equipment suitable for regulating temperature (e.g., an inductive heater, a direct resistance heater, insulation, and the like).

Figure 10:
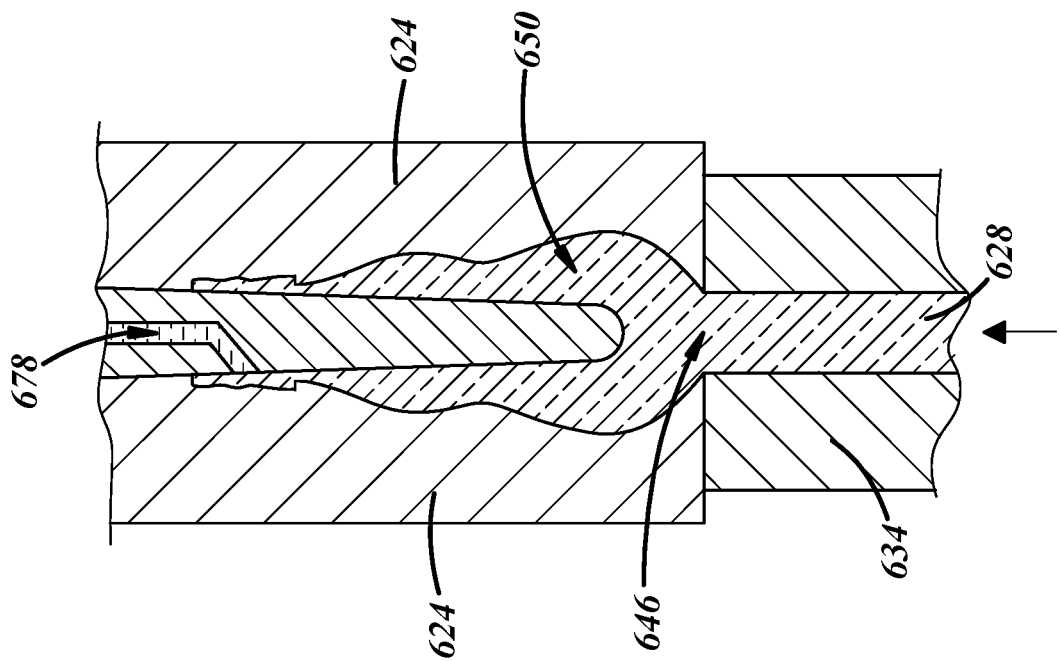
FIG. 10 is a schematic cross-sectional view illustrating a mold and a blank plunger, where the mold receives a charge of molten glass from the conduit, and where the blank plunger includes at least one vacuum passage, in accordance with an illustrative embodiment of the present disclosure.

FIG. 10 illustrates a mold 624 where at least one vacuum passage 678 can extend through a portion of a blank plunger 668 for providing a vacuum to a chamber 650. This embodiment is similar in many respects to the embodiment of FIGS. 1 through 9, and like numerals among the embodiments generally designate like or corresponding elements throughout the several views of the drawing figures. Accordingly, the descriptions of the embodiments are incorporated into one another, and description of subject matter common to the embodiments generally may not be repeated here.

Referring to FIG. 10, the vacuum provided by the at least one vacuum passage 678 can draw a molten glass stream 628 and/or a glass charge through an end 646 of the conduit 634 and/or an orifice into the chamber 650 and against the wall of the chamber 650 for at least partially forming the parison. It will be appreciated that the blank plunger 668 may include additional vacuum passage numbers and/or configurations.

Figure 11:
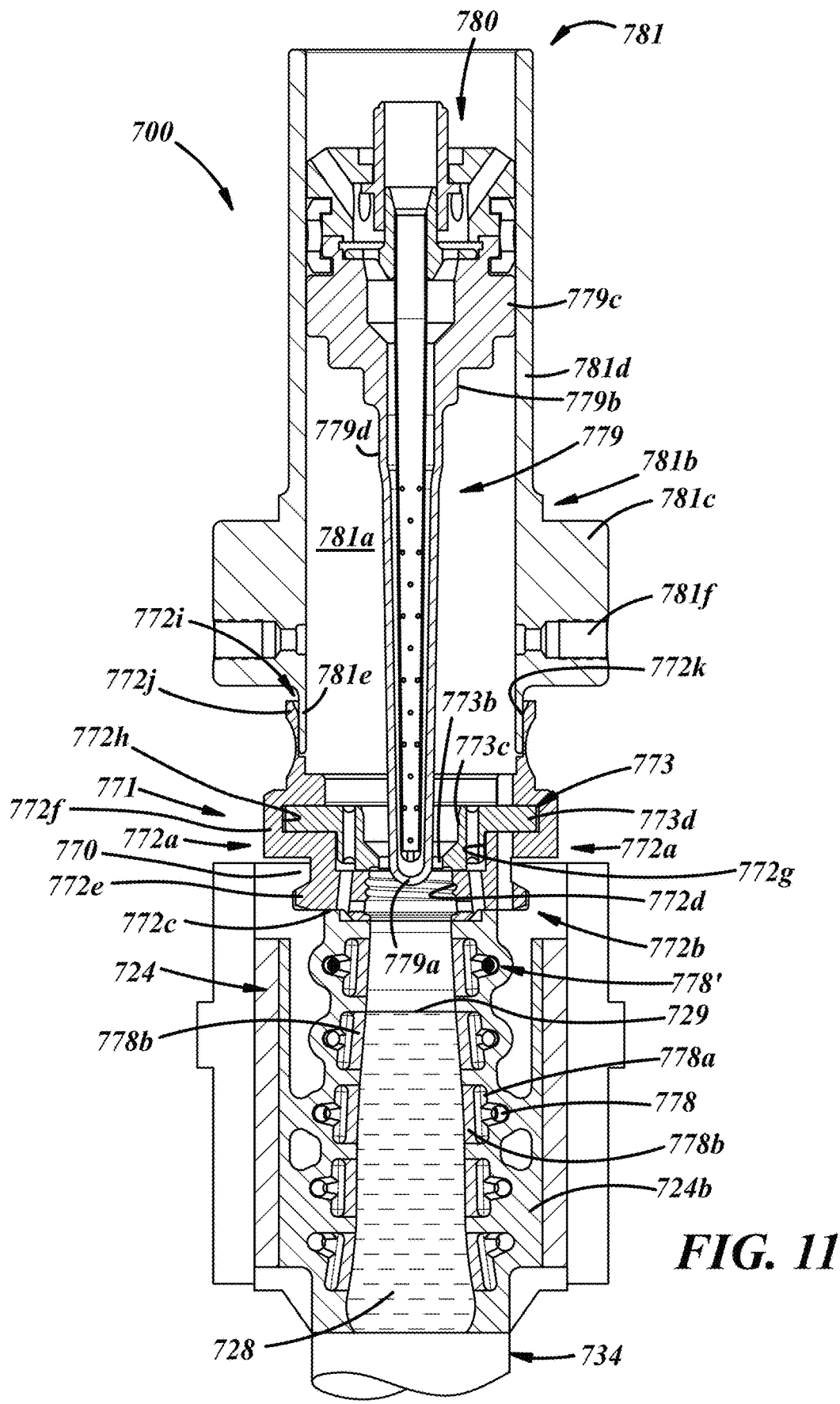
FIG. 11 is a longitudinal sectional view illustrating a conduit for conveying molten glass, a blank mold to receive molten glass from the conduit, a neck ring assembly coupled to an upper end of the blank mold, a neck ring arm coupled to the neck ring assembly, and a plunger carried in a plunger sleeve, in accordance with an illustrative embodiment of the present disclosure.

FIG. 11 illustrates an embodiment of a molding apparatus or equipment 700 including a conduit 734 for conveying molten glass, a mold 724 to receive the molten glass from the conduit 734 and form a portion of a glass parison (not shown), and a neck ring assembly 771 having a neck ring 772 with neck ring sections or halves 772a and a neck ring guide 773 cooperative with an upper portion/end 770 of the mold 724 to partially define an upper portion of the glass parison (not shown). The apparatus 700 also includes a plunger 779 cooperative with the neck ring assembly 771 and the mold 724 to partially define interior portions of the glass parison, and a plunger sleeve 781 in which the plunger 779 is movably carried. This embodiment is similar in many respects to the embodiments of FIGS. 1 through 10, and like numerals among the embodiments generally designate like or corresponding elements throughout the several views of the drawing figures. Accordingly, the descriptions of the embodiments are incorporated into one another, and description of subject matter common to the embodiments generally may not be repeated here. However, unlike the molding configurations shown in FIGS. 9 and 10 where vacuum is applied so as to pull molten glass up into and through molds and into neck rings for a complete fill of molten glass, here vacuum is applied selectively to achieve a partial fill of molten glass as will be described in further detail below.

Figure 12:
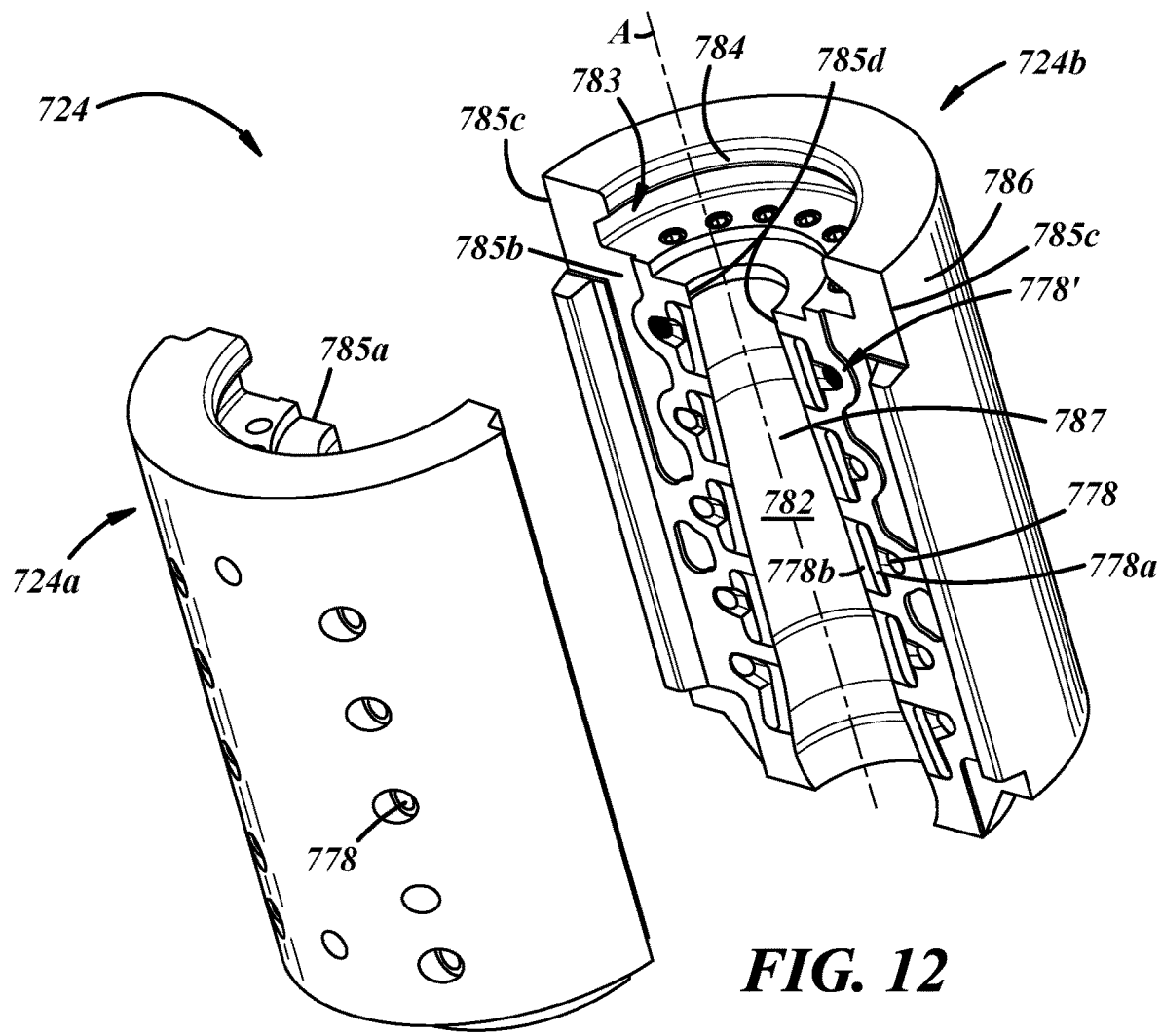
FIG. 12 is an exploded perspective view of the blank mold of FIG. 11, illustrating blank mold halves that constitute the blank mold and various vacuum vent features of the mold.
Figure 13:
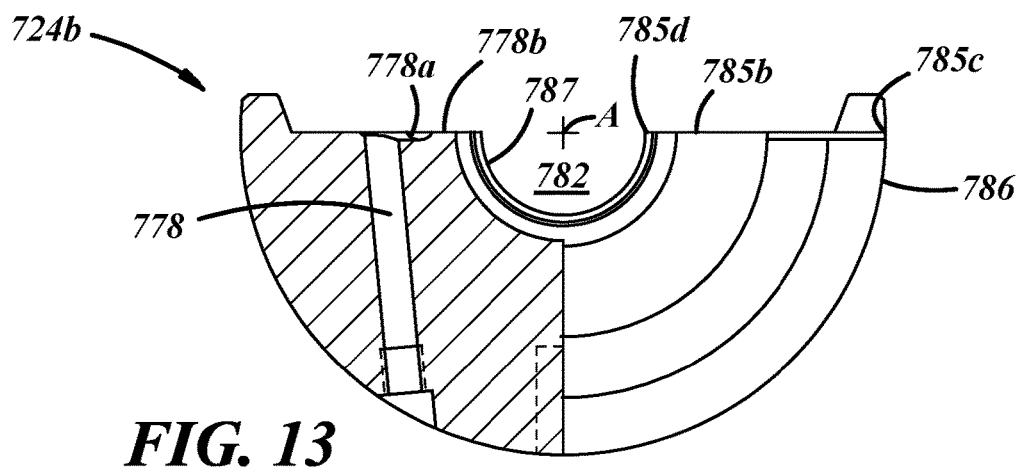
FIG. 13 is a cross-sectional view of the blank mold of FIG. 11, taken through central vacuum vent features.

With reference now to FIG. 12, the mold 724 includes male and female mold sections or halves 724a,b openable and closeable with respect to one another and having through passage portions 782 extending between lower and upper ends of the halves 724a,b and neck ring counterbore portions 783 at the upper ends with neck ring interlock features 784 that may extend radially inwardly. The mold halves 724a,b also include diametrically extending mating faces 785a,b having radially outward and inward portions 785c,d, circumferentially extending outer surfaces 786 connecting the radially outward portions 785c of the mating faces 785a,b, and mold cavity surfaces 787 connecting radially inward portions 785d of the mating faces 785a,b. With reference also to FIG. 13, the mold halves 724a,b also include one or more vacuum vent features that include vacuum vent passages 778 that may extend chordally through the mold body halves 724a,b between the outer surfaces 786 and mating faces 785a,b and being open thereto. Likewise, the vacuum vent features also may include vent grooves 778a in the mating faces 785a,b radially between interior ends of the vent passages 778 and the mold cavity surfaces 787, and face vents 778b in the mating faces 785a,b radially between the vent grooves 778a and the mold cavity surfaces 787.

In the illustrated embodiment of FIG. 12, the mold 724 includes a plurality of levels of such vacuum vent features to vary a mass of the molten glass charge. In the illustrated example, the mold halves 724a,b include five pairs of vent passages 778, vent grooves 778a, and face vents 778b, axially spaced from one another along a longitudinal axis A of the mold 724. But any other suitable quantity and spacing of such vent features could be provided. In this embodiment, however, an uppermost one of the vent passages 778 is plugged such that it constitutes a plugged vent passage 778'. In other embodiments, not illustrated in the drawings, an uppermost set of vent features including a vent passage and corresponding vent groove and face vent, could be omitted completely instead of plugging such features. The reason for plugging or omitting the uppermost vent passage will become apparent with reference again to FIG. 11 and will be discussed in further detail below.

In FIG. 11, a molten glass stream 728 in the mold 724 has an exposed uppermost surface 729, such that the mold 724 is not completely filled with molten glass. Rather, the molten glass stream 728 partially fills the mold 724 up to a certain point. In the illustrated embodiment, that certain point is a level equal to a relative height of an uppermost portion of the highest of the face vents 778b. This is accomplished by pulling vacuum through the vent passages 778, vent grooves 778a, and face vents 778b, to pull the stream 728 of molten glass up to but not beyond the uppermost one of the face vents 778b. Select vent passages 778 may be blocked with plugs inserted in the passages 778, valves, or different manifolds on the mold arm/holder to allow for different vacuum levels. Also, the location and/or length of the face vents 778b can be varied to modify fill volume. During filling of the mold 724, the volume above the uppermost surface 729 of the molten glass may be communicated to atmosphere or may be exposed to a slight vacuum to facilitate mold filling.

As a group, the multiple sets of vacuum passages, grooves, and face vents are located at a height in the mold that may be directly proportional to a size of a bubble or void desired in the parison as a result of blank molding. Again, although not shown, a separate manifold could be used for the mold arm such that the uppermost vent features are blocked during mold filling, but, after mold filling and at least before blank molding, are opened and exposed to vacuum to lift or help suspend the molten glass for placement of the baffle and subsequent blank molding.

With continued reference to FIG. 11, the neck ring assembly 771 includes a neck ring 772 with halves 772a openable and closeable with respect to one another and a guide ring 773 positioned therebetween to guide the neck ring halves 772a. The neck ring halves 772a include mold body ends 772b with axially facing end surfaces 772c, radially inwardly facing neck finish forming portions 772d, and mold body interlock features 772e that may extend radially outwardly. The neck ring halves 772a also include guide body midsections 772f with guide hub pockets 772g and guide slot portions 772h, and plunger sleeve ends 772i with annular extending walls 772j establishing a plunger sleeve counterbore 772k. The guide ring 773 includes a neck finish forming hub 773a carried in the guide hub pockets 772g of the neck ring halves 772a and having a throughbore 773b and a counterbore 773c, and a guide flange 773d extending radially outwardly from the hub 773a and carried in the guide slot portions 772h of the neck ring halves 772a.

Figure 14:
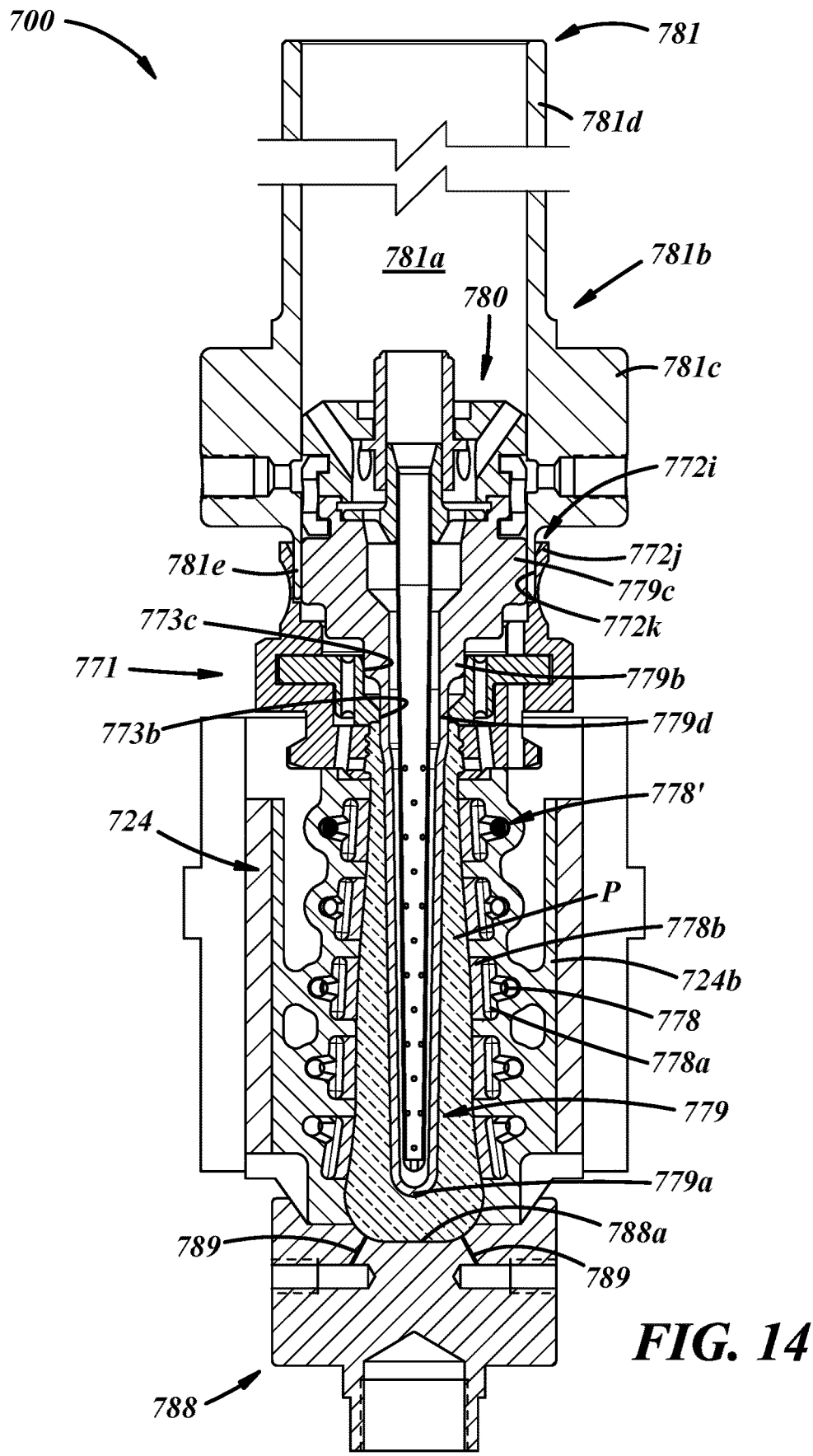
FIG. 14 is a longitudinal sectional view illustrating the conduit, the blank mold, the neck ring assembly, the neck ring arm, the plunger, and the plunger sleeve of FIG. 11, and further illustrating a baffle at a lower end of the blank mold and the plunger advanced into the blank mold.

With reference now to FIG. 14, the molding apparatus 700 is illustrated in a parison-forming position, wherein the molding apparatus 700 has been separated from the conduit 734 (FIG. 11) so as to establish a molten glass charge that, as illustrated, has been formed into a parison P with cooperation of a baffle 788 that has been moved into place at a lower end of the mold 724. More specifically, the plunger 779 is movable down toward the mold 724 and is cooperative with the neck ring assembly 771, the mold 724, and the baffle 788 to at least partially define the glass parison P. The apparatus 700 also may include a plunger cooler assembly 780 coupled to and cooperative with the plunger 779 to cool the plunger 779. The plunger 779 includes a plunger nose 779a extendible into and through the throughbore 773b of the guide ring 773 and down into the mold 724, and a guide ring shoulder 779b carried in the guide ring counterbore 773c. The plunger 779 also includes a neck ring shoulder 779c carried radially within the plunger sleeve counterbore 772k of the plunger sleeve ends 772i of the neck ring halves 772a, and a hub shoulder 779d carried radially within the throughbore 773b of the neck finish forming hub 773a of the guide ring 773.

With continued reference to FIG. 14, the plunger sleeve 781 includes a plunger passage 781a established by a circumferentially extending wall 781b including a relatively thick-walled section 781c having pneumatic passages 781f extending radially therethrough, a retraction section 781d extending rearwardly from the thick-walled section 781c to receive and guide the plunger 779 when the plunger 779 is fully retracted, and a neck ring section 781e that extends axially into the plunger sleeve counterbore 772k of the neck ring 772. The neck ring section 781e may be a relatively thin-walled section compared to the relatively thick-walled section 781c and may extend forwardly from the thick-walled section 781c and into the plunger sleeve counterbore 772k radially between the radially outer neck ring shoulder 779c of the plunger 779 and the annular extending walls 772j of the plunger sleeve ends 772i of the neck ring 772 when the plunger 779 is in a fully advanced position relative to the mold 724 as shown in FIG. 14.

Locating the neck ring section 781e in the above-described manner allows for the plunger 779 to be fully retracted without losing vacuum capability. With conventional blank molding equipment, a plunger seals directly to a neck ring to provide a plenum to allow vacuum to be applied. With the presently disclosed plunger sleeve 781, however, the plunger 779 need not seal directly to the neck ring 772. Instead, the plunger 779 can be in a fully retracted position or in any other retracted position, where vacuum can be applied through the plunger sleeve 781 and/or can be applied through the plunger itself, for example, from an uppermost portion of a mold gear (not shown). Accordingly, application of vacuum to the mold 724 is no longer dependent on axial position of the plunger 779.

FIG. 14 also shows the baffle 788 cooperative with the lower portion of the mold 724 and including a molding surface 788a to partially define a lower portion of the glass parison P. The baffle 788 may include one or more vacuum vent passages 789 therein or therethrough. To assist with pulling molten glass into the mold 724 and/or to assist with molding, vacuum may be applied through one or more of the mold 724, the neck ring assembly 771, the plunger 779, the plunger sleeve 781, and/or the baffle 788.

Those of ordinary skill in the art would recognize that a blow-and-blow molding apparatus like that illustrated in FIGS. 7 and 8 could likewise be configured with the various features disclosed in the present embodiment. But it also may be necessary to obtain a gather or mold charge in the mold with the baffle side of the mold down, then close the mold with a baffle, then invert the entire blank mold and baffle assembly, for example, similar to a Lynch machine, such that the baffle is on top and the neck finish at bottom, then perform a blow and blow parison forming step, and finally invert the blank assembly back over for transfer of the parison to a blow mold. Otherwise, the mold charge or gather may run back down the mold cavity during glass reheat and make an undesired additional bubble in the parison. The final invert might be avoidable depending on equipment used and/or process parameters applied.

Figures 15, 16:
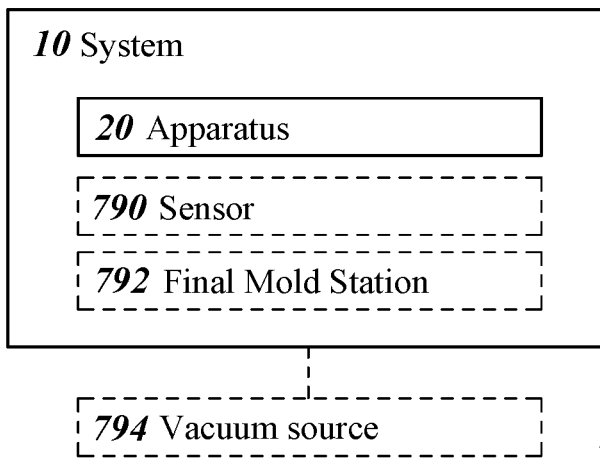
FIG. 15 is a diagrammatic view illustrating various elements of a system, including the apparatuses shown in FIGS. 1 through 14, for delivering molten glass to the mold, in accordance with an illustrative embodiment of the present disclosure.
FIG. 16 is a flow diagram showing various steps of a method for delivering molten glass to at least one mold, in accordance with an illustrative embodiment of the present disclosure.

Referring to FIG. 15, the system 10 may include an apparatus 720 for providing molten glass, a sensor 790, a final mold station 792 (e.g., a blow mold or other finish mold configured to receive the glass parison or blank from the apparatus 720), and/or a vacuum source 794. This embodiment is similar in many respects to the embodiment of FIGS. 1 through 14, and like numerals among the embodiments generally designate like or corresponding elements throughout the several views of the drawing figures. Accordingly, the descriptions of the embodiments are incorporated into one another, and description of subject matter common to the embodiments generally may not be repeated here.

When included in the system 10 shown in FIG. 15, the sensor 790 may be positioned in communication with and/or with a field-of-view into the mold 24, 124, 424, 524, 624, 724. The sensor 790 can be configured to detect an amount of molten glass within the mold 24. When the sensor 790 detects that a predetermined amount of molten glass has been dispensed in the mold 24, 124, 424, 524, 624, 724, a controller (not shown) coupled to the sensor 790 and the apparatus 20, 220, 320, 720 can be used to stop the molten glass stream 28, 228, 328, 428, 628, 728 for example, by sending an off signal to a drive mechanism of a plunger, a pressure source, and/or a vacuum source. Some examples of the sensor 790 may include an optical sensor, a thermocouple, a vacuum sensor, and/or an electrical resistance sensor. It is contemplated that other suitable sensors may be incorporated into a control scheme of the system 10.

Illustrated in FIG. 15, the vacuum source 794 can be configured to provide vacuum to the mold 24, 124, 424, 524, 624, 724 and/or the mold cavity 50, 550, 650. The vacuum source 794 may be operably coupled to the mold 24, 124, 424, 524, 624, 724 (e.g., hoses, tubing), and may provide a vacuum, for example, by way of at least one mold vacuum passage 574a, 574b (e.g., a channel formed in the mold 24), or mold vent features 778, 778a,b, at least one plunger vacuum passage 678 (e.g., a channel formed in the blank plunger 668), and/or one or more vacuum vent passage 789 of the baffle 788. The vacuum source 794 may include a vacuum pump coupled to a vacuum reservoir, for example, although it will be appreciated that other vacuum sources may be implemented. The vacuum provided by the vacuum source 794 may include any level of vacuum below the pressure above the molten glass level 48 in the system 10.

FIG. 16 illustrates an example of a method 800 for providing molten glass 30 from a glass melting furnace 12 to at least one mold 24, 124, 424, 524, 624, 724. For purposes of illustration and clarity, method 800 will be described in the context of the systems and the apparatuses described above and illustrated in FIGS. 1 through 15. It will be appreciated, however, that the application of the present methodology is not meant to be limited solely to such an arrangement, but rather method 800 may find application with any number of arrangements (i.e., steps of method 800 may be performed by components of the system and the apparatuses other than those described below, or arrangements of the system and the apparatuses other than that described above).

Method 800 comprises a step 802 of providing an uninterrupted glass communication path 26, 326 from the outlet 19 of the glass melting furnace 12 to at least one mold 24, 124, 424, 524, 624, 724. Providing the uninterrupted glass communication path 26, 326 can include providing the conduit 34, 134, 234, 334, 434, 534, 634, 734 extending from the forehearth 18 to the at least one orifice 40, 140, 340a,b,c, where the molten glass stream 28, 228, 328, 428, 628, 728 can flow through the conduit 34, 134, 234, 334, 434, 534, 634, 734 without any break, gap, valve, and/or other interruption. For example, the uninterrupted glass communication path 26, 326 may include a path from the forehearth 18 and/or the feeder plunger 32, through the conduit 34, 134, 234, 334, 434, 534, 634, 734 and/or the throat 358, and/or through the at least one orifice 40, 140, 340a,b,c, where the path may not include any valves or other mechanical impediments. In another example, there may be little to no air gaps in the molten glass stream 28, 228, 328, 428, 628, 728. In instances where a feeder plunger 32 is used, the glass communication path 26, 326 can also be uninterrupted because the molten glass stream 28, 228, 328, 428, 628, 728 can continuously flow from the forehearth 18, past/through the feeder plunger 32, and through the conduit 34, 134, 234, 334, 434, 534, 634, 734 unimpeded.

Method 800 comprises a step 804 of pressurizing the uninterrupted glass communication path 26, 326 at a location downstream of the outlet 19 to move the molten glass stream 28, 228, 328, 428, 628, 728 into the at least one mold 24, 124, 424, 524, 624, 724. Pressurizing the uninterrupted glass communication path 26, 326 may include providing a force and/or a path for moving the molten glass stream 28, 228, 328, 428, 628, 728, for example, using a feeder plunger 32 and/or conduit 34, 134, 234, 334, 434, 534, 634, 734. When the feeder plunger 32 is used, pressurizing the molten glass stream 28, 228, 328, 428, 628, 728 may include advancing or rotating the feeder plunger 32 to apply an extrusion force to the molten glass 30 from the glass forehearth 18 parallel with the path 26, 326 and to move the resulting molten glass stream 28, 228, 328, 428, 628, 728 into and through the conduit 34, 134, 234, 334, 434, 534, 634, 734. In the case of a screw plunger, pressurizing the uninterrupted glass communication path 26, 326 may include advancing the feeder plunger 32 by rotating the screw plunger at a desired rate. When a reciprocating plunger is used, the feeder plunger 32 may be advanced, for example, by reciprocating the feeder plunger 32 (e.g., acting as a piston). Advancement of the feeder plunger 32 may be controlled by an actuator and controller.

In a specific implementation, with reference to FIG. 5, pressurizing the uninterrupted glass communication path 226 may include using head pressure from the molten glass level 248 in the glass forehearth 218 to flow the molten glass stream 228 through the conduit 234. In this example, the exit 244 of the glass feeder 222 can be disposed below the molten glass level 248, where the height difference between the conduit exit 244 and the molten glass level 248 creates a pressure differential, which can cause the molten glass 230 to flow from the glass forehearth 218 into and through the conduit 234. It is contemplated that pressurizing the uninterrupted glass communication path 226 and/or the molten glass stream 228 from the glass forehearth 218 into the conduit 234 may utilize other suitable equipment and/or processes.

In a further specific implementation, with reference to FIG. 1, pressurizing the uninterrupted glass communication path 26 may include flowing the molten glass stream 28 into the conduit 34 vertically downward from the glass forehearth 18, through the conduit 34, and upward through the orifice 40 and into the mold 24.

In another specific implementation, with reference to FIG. 6, pressurizing the uninterrupted glass communication path 326 may include flowing the molten glass stream 328 into the conduit 334 horizontally from the glass forehearth 318, through the conduit 334, and upward through the orifice 340 and into at least one mold 324. It will be appreciated that pressurizing the uninterrupted glass communication path 326 may include flowing the molten glass stream 328 in a variety of suitable configurations and directions. In another implementation, pressurizing the uninterrupted glass communication path 326 can include using the pressure device 366 to provide continuous and/or intermittent pressure at a location 364 downstream from the throat 358 and transverse to the path 26 for moving the molten glass stream 328 through the conduit 334. For example, pressurizing the uninterrupted glass communication path 326 may include using a plunger to provide pressure through the riser 362. In another example, pressurizing the uninterrupted glass communication path 326 may include supplying pressurized air via the riser 362.

In some instances, pressurizing the uninterrupted glass communication path 26, 326 may include using the vacuum source 794 to provide a vacuum to the mold 24, 124, 424, 524, 624, 724. The vacuum within the mold 24, 124, 424, 524, 624, 724 can serve to at least partially draw the molten glass stream 28, 228, 328, 428, 628, 728 from the conduit 34, 134, 234, 334, 434, 534, 634, 734 into the cavity 50, 650 of the mold 24, 124, 424, 524, 624, 724. For example, providing the vacuum to the mold 24, 124, 424, 524, 624, 724 may include providing the vacuum to at least one vacuum passage 574a, 574b, 678, 778, 789. Additionally, providing a vacuum to the mold 24, 124, 424, 524, 624, 724 may include starting, stopping, and/or adjusting the amount of vacuum provided. In some instances, providing the vacuum to the mold 24, 124, 424, 524, 624, 724 may include positioning the blank plunger 468, 568, 668, 778, 789 into and/or against the mold 24, 124, 424, 524, 624, 724 to create, maintain, and/or release a vacuum seal within the cavity 50, 650.

Additionally, pressurizing the uninterrupted glass communication path 26, 326 can include using the orifice 40, 140, 340a,b,c, for restricting flow or using the temperature regulating device 576 (e.g., for regulating temperature and viscosity of the molten glass) to at least partially control the flow rate of the molten glass stream 28, 228, 328, 428, 628, 728. Advancement of the feeder plunger 32, control of the orifice 40, 140, 340a,b,c, and/or control of the pressure device 366 may be controlled by an actuator and controller (not shown).

In some instances, method 800 may comprise a step 806 of monitoring a quantity of molten glass in the mold 24, 124, 424, 524, 624, 724. In one instance, monitoring the quantity of molten glass in the mold 24, 124, 424, 524, 624, 724 can include using the sensor 790, which may be disposed with a field-of-view into one end of the mold 24, 124, 424, 524, 624, 724 (e.g., an end that is distal from an end that is configured to receive molten glass from the orifice 40, 140, 340a,b,c). The sensor 790 can detect the molten glass using, for example, infrared light. A controller can receive information from the sensor 790 and can determine the level of the molten glass within the mold 24, 124, 424, 524, 624, 724.

Method 800 may comprise a step 808 of stopping advancement of the molten glass stream 28, 228, 328, 428, 628, 728 when a predetermined amount of molten glass is in the mold 24, 124, 424, 524, 624, 724. In embodiments where a feeder plunger 32 is used, the feeder plunger 32 can be stopped, reversed, and/or retracted to control the flow of molten glass into the mold 24, 124, 424, 524, 624, 724. Additionally, stopping the advancement of the molten glass stream 28, 228, 328, 428, 628, 728 may include adjusting the vacuum source 784 to provide less vacuum within the mold 24, 124, 424, 524, 624, 724 or more vacuum in the conduit 34, 134, 234, 334, 434, 534, 634, 734.

In some implementations, method 800 may include a step 810 of moving the mold 24, 124, 424, 524, 624, 724 away from the conduit 34, 134, 234, 334, 434, 534, 634, 734 and/or the orifice 40 to expose the molten glass in the mold 24, 124, 424, 524, 624, 724. The mold 24, 124, 424, 524, 624, 724 may be coupled to an arm or other equipment that can move and/or rotate the mold 24, 124, 424, 524, 624, 724 from the conduit 34, 134, 234, 334, 434, 534, 634, 734 and/or orifice 40, 140, 340a,b,c to a subsequent process step, for example, a parison blow position and then to the final mold station 782. The mold 24, 124, 424, 524, 624, 724 and/or the mold arms 125 can be moved using a controller and/or an actuator coupled to the controller.

Additionally, method 800 may comprise a step 812 of separating the molten glass between the conduit 34, 134, 234, 334, 434, 534, 634, 734 and/or orifice 40 and the mold 24, 124, 424, 524, 624, 724 using the separation device 152. For example, prior to and/or during moving the mold 24, 124, 424, 524, 624, 724 with a charge of molten glass, the separation device 152 can shear and/or otherwise separate the molten glass in the mold 24, 124, 424, 524, 624, 724 from the molten glass stream 28, 228, 328, 428, 628, 728 in the conduit 34, 134, 234, 334, 434, 534, 634, 734 and/or the orifice 40 to define the charge of molten glass in the mold. It will be appreciated that separating the molten glass can include using other suitable equipment and/or techniques.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. An apparatus for providing molten glass, comprising:
a glass feeder in downstream fluid communication with a glass forehearth, the glass feeder including a conduit configured for directing molten glass from the glass forehearth, and a movable feeder plunger;
at least one mold configured to receive the molten glass; and
at least one orifice device coupled to the conduit, wherein the at least one orifice device is a heated orifice device, wherein the glass feeder is configured to provide an uninterrupted glass communication path from an outlet of the glass forehearth to the at least one mold and along which path a molten glass stream is flowable from the glass forehearth to the at least one mold and is pressurizable by movement of the movable feeder plunger to advance molten glass into the at least one mold to establish a molten glass charge in the at least one mold.

2. The apparatus in claim 1, wherein the uninterrupted glass communication path has no air gap or an air gap of less than five millimeters.

3. The apparatus in claim 1, wherein the feeder plunger moves parallel to the uninterrupted glass communication path.

4. The apparatus in claim 1, wherein the feeder plunger moves transverse to the uninterrupted glass communication path.

5. The apparatus in claim 1, wherein the feeder plunger includes at least one of a screw plunger or a reciprocating plunger.

6. The apparatus in claim 1, wherein the conduit is temperature controlled.

7. The apparatus in claim 1, wherein a pressure of the molten glass proximate to an end of the conduit is at a pressure of a molten glass level in the glass forehearth.

8. The apparatus in claim 1, wherein the at least one mold includes a blank plunger.

9. The apparatus in claim 8, wherein the blank plunger includes at least one vacuum passage.

10. The apparatus in claim 1, wherein the at least one mold includes at least one vacuum passage configured to provide a vacuum to a chamber of the at least one mold.

11. The apparatus in claim 1, wherein the conduit includes a throat portion with a reduced cross-section area disposed downstream of the outlet.

12. The apparatus in claim 11, wherein the throat portion is heated.

13. The apparatus in claim 1, wherein an exit of the conduit is disposed at or below a molten glass level in the glass forehearth.

14. The apparatus in claim 1, further comprising:
a separation device between the conduit and the at least one mold and configured to separate glass in the at least one mold from the molten glass in the glass feeder.

15. The apparatus in claim 1, wherein the at least one orifice device includes a heated platinum orifice device.

16. The apparatus in claim 1, wherein the at least one mold is configured to receive the molten glass upwardly from the conduit.

17. A system, comprising:
an apparatus for providing molten glass, set forth in claim 1; and
a glass furnace including the glass forehearth.

18. The system in claim 17, further comprising:
a final mold station configured to receive a glass charge from the at least one mold.

19. The system in claim 17, further comprising:
a sensor configured to detect an amount of glass in the at least one mold.

20. An apparatus for providing molten glass, comprising:
a glass feeder in downstream fluid communication with a glass forehearth, the glass feeder including a conduit configured for directing molten glass from the glass forehearth, and a movable feeder plunger;

at least one mold configured to receive the molten glass; and at least one orifice coupled to the conduit, wherein the at least one orifice is a heated orifice, wherein the glass feeder is configured to provide an uninterrupted glass communication path from an outlet of the glass forehearth to the at least one mold and along which path a molten glass stream is flowable from the glass forehearth to the at least one mold and is pressurizable by movement of the movable feeder plunger, wherein there is no gap between the at least one orifice and the at least one mold.

21. A system, comprising:

an apparatus for providing molten glass, comprising:

a mold; and a glass feeder to hold molten glass, and including a conduit in fluid communication with the mold to direct a stream of the molten glass toward the mold, and a movable feeder plunger to pressurize the molten glass to move the stream of the molten glass through the conduit to advance the molten glass into the mold; and a sensor configured to detect an amount of glass in the mold, wherein the movable feeder plunger is controlled to stop the advance of the molten glass into the mold when a predetermined amount of the molten glass is detected in the mold by the sensor.

22. The apparatus of claim 21, wherein the mold includes vacuum passages to facilitate drawing a molten glass charge into the mold from the molten glass stream.

23. The apparatus of claim 21, wherein the movable feeder plunger is movable parallel to a path of the stream of the molten glass.

24. The apparatus in claim 21, wherein the movable feeder plunger is movable transverse to a path of the stream of the molten glass.

25. The apparatus in claim 21, wherein the movable feeder plunger includes at least one of a screw plunger or a reciprocating plunger.

26. A glass parison molding apparatus, comprising:

a mold including mold sections openable and closeable with respect to one another and having through passage portions extending between lower and upper ends and neck ring interlock features;

a neck ring assembly including neck ring sections openable and closeable with respect to one another and having mold body ends with axially facing end surfaces, radially inwardly facing neck finish forming portions, mold body interlock features, guide body midsections with guide hub pockets and guide slot portions, and plunger ends with annular extending walls establishing a plunger sleeve counterbore, and a guide ring including a neck finish forming hub carried in the guide hub pockets of the neck ring sections and having a throughbore and a counterbore, and a guide flange carried in the guide slot portions of the neck ring sections;

a plunger sleeve having a wall establishing a plunger passage and including a neck ring section of the plunger sleeve that extends axially into the plunger sleeve counterbore of the neck ring sections of the neck ring assembly; and a plunger in the plunger passage of the plunger sleeve and movable axially along the plunger sleeve and including a neck ring shoulder, wherein the neck ring section of the plunger sleeve is located radially between the neck ring shoulder of the plunger and the annular extending walls of the plunger ends of the neck ring sections of the neck ring assembly when the plunger is in a fully advanced position relative to the mold and when the plunger is in a retracted position relative to the mold so that vacuum can be applied to the mold through at least one of the plunger sleeve or the plunger even when the plunger is in the retracted position.

27. The apparatus of claim 26, wherein the neck ring section of the plunger sleeve is in contact with both the neck ring shoulder of the plunger and the annular extending walls of the plunger ends of the neck ring sections of the neck ring assembly when the plunger is in a fully retracted position relative to the mold.

* * * * *